United States Patent
Morooka

(10) Patent No.: US 8,363,234 B2
(45) Date of Patent: Jan. 29, 2013

(54) INFORMATION PROCESSING APPARATUS, METHOD, AND PROGRAM PRODUCT WITH OPERATION FOR EDITING TEMPLATE DESIGNATING PRINTER FUNCTIONS

(75) Inventor: Hidekazu Morooka, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1263 days.

(21) Appl. No.: 12/122,328

(22) Filed: May 16, 2008

(65) Prior Publication Data

US 2008/0285082 A1 Nov. 20, 2008

(30) Foreign Application Priority Data

May 17, 2007 (JP) .................................. 2007-132032
Mar. 21, 2008 (JP) .................................. 2008-074382

(51) Int. Cl.
*H04N 1/387* (2006.01)
*G06K 15/02* (2006.01)

(52) U.S. Cl. ..................................... 358/1.13; 358/1.18

(58) Field of Classification Search ................... 358/1.9, 358/2.1, 3.24, 1.13, 1.18, 537, 452, 462, 358/468; 715/243, 248, 249, 250, 253, 255, 715/273, 274

See application file for complete search history.

(56) References Cited

U.S. PATENT DOCUMENTS

| | | | |
|---|---|---|---|
| 7,102,783 B2 * | 9/2006 | Morooka et al. | 358/1.18 |
| 7,307,745 B2 * | 12/2007 | Tanaka | 358/1.13 |
| 7,426,057 B2 * | 9/2008 | Mori et al. | 358/1.18 |
| 7,474,429 B2 * | 1/2009 | Morooka et al. | 358/1.15 |
| 7,688,459 B2 * | 3/2010 | Mori et al. | 358/1.13 |
| 2004/0163049 A1 * | 8/2004 | Mori et al. | 715/527 |
| 2010/0060929 A1 * | 3/2010 | Koizumi | 358/1.15 |

FOREIGN PATENT DOCUMENTS

| | | |
|---|---|---|
| JP | 9-26867 A | 1/1997 |
| JP | 2004-252665 A | 9/2004 |

* cited by examiner

*Primary Examiner* — Scott A Rogers
(74) *Attorney, Agent, or Firm* — Rossi, Kimms & McDowell LLP

(57) ABSTRACT

This invention allows the user to easily make an edit operation of a template even when the functions of a printing apparatus have changed. This invention is directed to an information processing apparatus, which is connected to a printer and edits a template that designates functions to be executed by the printer upon printing, including a unit which acquires information associated with newly executable functions by a newly connected printer, and a unit which generates a template that designates the acquired functions.

8 Claims, 35 Drawing Sheets

FIG. 4A

| NO | ATTRIBUTE INFORMATION | | REMARKS |
|---|---|---|---|
| 1 | PRINT METHOD | SINGLE-SIDED / DOUBLE-SIDED / BOOKBINDING PRINTING | |
| 2 | PAPER SIZE | DOCUMENT SIZE / FIXED SIZE | • DESIGNATE Z-FOLDING FOR DESIGNATIONS "A3 + A4", "B4 + B3", AND "LETTER + LEDGER (11 × 17)"<br>• DOCUMENT SIZE FOR 1ST CHAPTER / 1ST PAGE IS AUTOMATICALLY SELECTED WHEN BOOKBINDING PRINTING OR N-up PRINTING IS DESIGNATED |
| 3 | PAPER ORIENTATION | PORTRAIT / LANDSCAPE | • SELECTABLE ONLY FOR FIXED SIZE |
| 4 | BINDING MARGIN / BINDING DIRECTION | | • ALLOW SHIFT / ENLARGEMENT OR REDUCTION DESIGNATION |
| 5 | N-up PRINTING | NUMBER OF PAGES / LAYOUT ORDER / BOUNDARY LINE / LAYOUT POSITION, ETC. | • 9 PATTERNS FOR LAYOUT POSITION<br>• ALLOW DESIGNATION OF EQUAL-SCALE PRINTING |
| 6 | SCALING | ON / OFF | • AUTOMATICALLY DESIGNATE ON UPON SELECTION OF FIXED SIZE FOR PAPER SIZE OR N-up PRINTING, OR ALLOW OFF DESIGNATION |
| 7 | WATERMARK | | • ALLOW INDIVIDUAL DESIGNATIONS FOR EACH LOGICAL PAGE AND FOR EACH PHYSICAL PAGE<br>• FOR ALL CHAPTERS / ALL PAGES |

FIG. 4B

| | | | |
|---|---|---|---|
| 8 | HEADER / FOOTER | | • ALLOW INDIVIDUAL DESIGNATIONS FOR EACH LOGICAL PAGE AND FOR EACH PHYSICAL PAGE<br>• FOR ALL CHAPTERS / ALL PAGES |
| 9 | DISCHARGE METHOD | STAPLE / PUNCH | • ALLOW DESIGNATION OF STAPLE / PUNCH FOR ONLY SINGLE-SIDED / DOUBLE-SIDED PRINTING |
| 10 | BOOKBINDING DETAIL | SPREAD DIRECTION / SADDLE STITCHING / ENLARGEMENT OR REDUCTION DESIGNATION / BINDING MARGIN / FASCICLE DESIGNATION, ETC. | • ONLY FOR BOOKBINDING PRINTING |
| 11 | FRONT / BACK COVER | | • PRINT DESIGNATION FOR FRONT COVER 1/2 AND BACK COVER 1/2<br>• DESIGNATE PAPER SOURCE (INCLUDING INSERTER) |
| 12 | INDEX SHEET | | • ALLOW SETTING OF PRINTING OF CHARACTER STRING ON INDEX PART AND ANNOTATION ON INDEX SHEET<br>• NOT DESIGNATED FOR BOOKBINDING PRINTING |
| 13 | INTERLEAVING SHEET | | • DESIGNATE PAPER SOURCE (INCLUDING INSERTER)<br>• ALLOW PRINTING OF DOCUMENT DATA ON INSERT SHEET<br>• NOT DESIGNATED FOR BOOKBINDING PRINTING |
| 14 | CHAPTER DIVISION | "NONE" / "PAGE CHANGE" / "SHEET CHANGE" | • "SHEET CHANGE" IS FIXED UPON DESIGNATION OF INDEX SHEET AND INTERLEAVING SHEET<br>• "SHEET CHANGE" FOR SINGLE-SIDED PRINTING |

FIG. 5

| NO | ATTRIBUTE INFORMATION | | REMARKS |
|---|---|---|---|
| 1 | PAPER SIZE | DOCUMENT SIZE / FIXED SIZE | • AUTOMATICALLY DESIGNATE "SHEET CHANGE" UPON SELECTION OF FIXED SIZE<br>• ALLOW TO CHANGE FOR ONLY DESIGNATED SHEET UPON SELECTION OF PLURAL SHEETS IN BOOK<br>ALLOW TO CHANGE PAPER SIZE IN DESIGNATION ACCORDING TO BOOK |
| 2 | PAPER ORIENTATION | PORTRAIT / LANDSCAPE | • SELECTABLE ONLY FOR FIXED SIZE |
| 3 | N-up PRINTING DESIGNATION | NUMBER OF PAGES / LAYOUT ORDER / BOUNDARY LINE / LAYOUT POSITION, ETC. | • 9 PATTERNS FOR LAYOUT POSITION<br>• ALLOW DESIGNATION OF EQUAL-SCALE PRINTING |
| 4 | SCALING | ON / OFF | • AUTOMATICALLY DESIGNATE ON UPON SELECTION OF FIXED SIZE FOR PAPER SIZE OR N-up PRINTING, OR ALLOW OFF DESIGNATION |
| 5 | WATERMARK | DISPLAY / NOT DISPLAY | • DESIGNATE WHETHER OR NOT TO DISPLAY ALL WATERMARKS DESIGNATED IN BOOK |
| 6 | HEADER / FOOTER | DISPLAY / NOT DISPLAY | • DESIGNATE WHETHER OR NOT TO DISPLAY ALL HEADERS / FOOTERS DESIGNATED IN BOOK |
| 7 | DISCHARGE METHOD | STAPLE | • ALLOW OFF UPON DESIGNATION OF STAPLE IN BOOK (DEFAULT=ON) |

FIG. 6

| NO | ATTRIBUTE INFORMATION | | REMARKS |
|---|---|---|---|
| 1 | PAGE ROTATION DESIGNATION | | • ALLOW TO DESIGNATE 0 / 90 / 180 / 270° |
| 2 | WATERMARK | DISPLAY / NOT DISPLAY | • DESIGNATE WHETHER OR NOT TO DISPLAY ALL WATERMARKS DESIGNATED IN BOOK |
| 3 | HEADER / FOOTER | DISPLAY / NOT DISPLAY | • DESIGNATE WHETHER OR NOT TO DISPLAY ALL HEADERS / FOOTERS DESIGNATED IN BOOK |
| 4 | ZOOM | 50%—200% | • DESIGNATE RELATIVE ZOOM RATIO WHEN SIZE THAT FITS VIRTUAL LOGICAL PAGE AREA IS 100% |
| 5 | LAYOUT POSITION | | • DESIGNATE FIXED 9 PATTERNS AND ARBITRARY POSITION |
| 6 | ANNOTATION | | |
| 7 | VARIABLE ITEM | | |
| 8 | PAGE DIVISION | | |

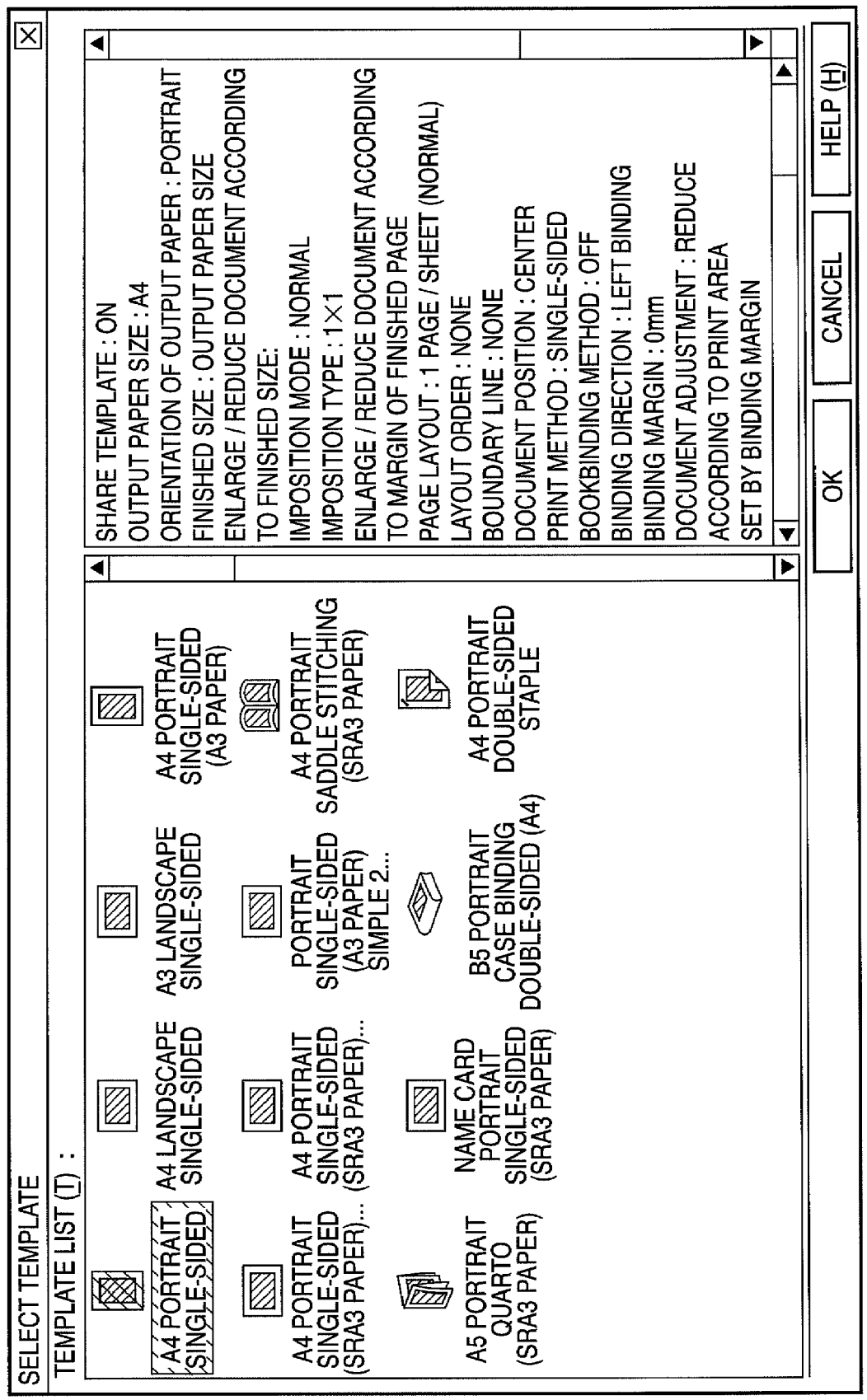

FIG. 15

| SET ENTIRE DOCUMENT | ☒ |

| PAPER SETTING | PAGE SETTING | FINISHING | EDIT | PAPER SOURCE | PRINT QUALITY |

PRINT METHOD (Y) :  ⦿ SINGLE-SIDED PRINTING
　　　　　　　　　　 ○ DOUBLE-SIDED PRINTING

BOOKBINDING METHOD (K) : [ OFF ▼ ]

BINDING DIRECTION (B) : [ LEFT BINDING ▼ ]

BINDING MARGIN (G) : [ 0 ⇅ ] mm (0~50)

DOCUMENT ADJUSTMENT (J) :
⦿ REDUCE ACCORDING TO PRINT AREA SET BY BINDING MARGIN
○ MOVE ACCORDING TO BINDING MARGIN

CHAPTER DIVISION (X) : [ OFF ▼ ]

FINISHER :
 DESIGNATION OF STAPLE (S) : [ OFF ▼ ]
 STAPLE POSITION (L) : [ UPPER LEFT ONE POSITION ▼ ]
 ☐ PUNCH (N)
 ☐ Z-FOLDING (Z)

[ RESTORE TO LATEST SAVED STATE (V) ]

[ OK ]　[ CANCEL ]　[ APPLY (A) ]　[ HELP (H) ]

F I G. 18
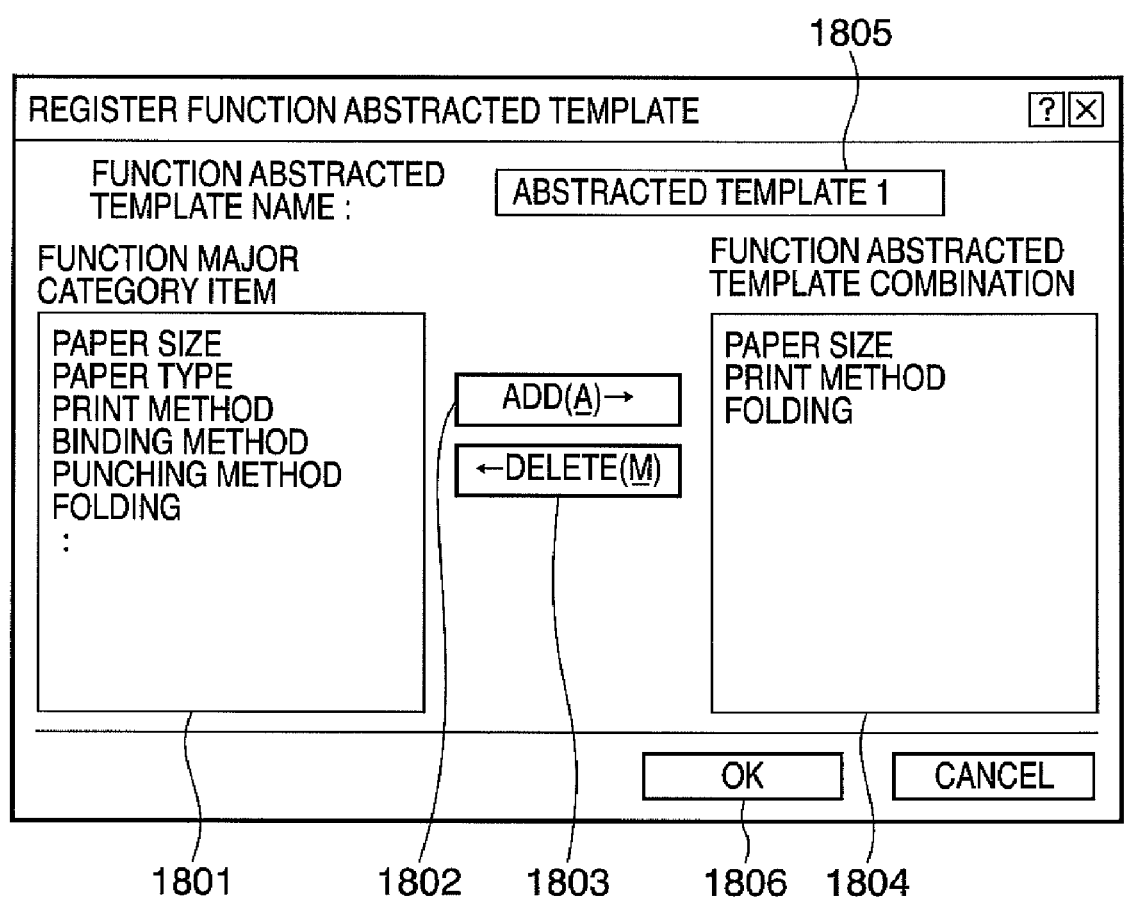

FIG. 19
FUNCTION MAJOR CATEGORY
BINDING METHOD
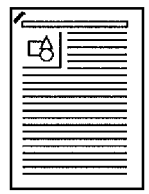 
VARIATION OF BINDING
PUNCHING METHOD
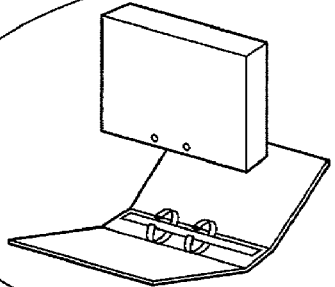 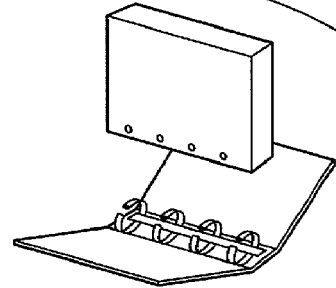
VARIATION OF PUNCHING METHOD
FOLDING
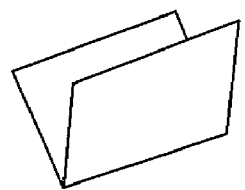 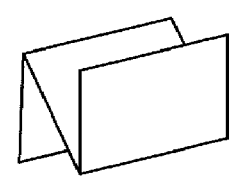
VARIATION OF FOLDING

FIG. 20

FUNCTION CATEGORY EXAMPLE)

|   | FUNCTION MAJOR CATEGORY EXAMPLE | REGISTERED FUNCTION EXAMPLE |
|---|---|---|
| 1 | PAPER SIZE | REGISTERED IN ADVANCE BY USER |
| 2 | PAPER BRAND | REGISTERED IN ADVANCE BY USER |
| 3 | PRINT METHOD | SINGL-SIDED, DOUBLE-SIDED, SADDLE STITCHING |
| 4 | BINDING METHOD | 1-POSITION BINDING, 2-POSITION BINDING |
| 5 | PUNCHING METHOD | BINDER 2 HOLES, BINDER 4 HOLES |
| 6 | FOLDING | V-FOLDING, Z-FOLDING |

FIG. 21

FUNCTION ABSTRACTED TEMPLATE EXAMPLE)

PAPER SIZE+PAPER TYPE

PAPER SIZE+FOLDING

PAPER SIZE+PRINT METHOD+FOLDING

F I G. 25

| TEMPLATE | TEMPLATE SETTING | USABLE DRIVER | CONFLICT |
|---|---|---|---|
| TEMPLATE (1) | A4, SINGLE-SIDED, C-FOLDING | DEVICE A, DEVICE B | NO |
| TEMPLATE (2) | A4, DOUBLE-SIDED, C-FOLDING | DEVICE B | NO |
| TEMPLATE (3) | A4, SADDLE STITCHING, C-FOLDING | NONE | YES |
| | ⋮ | ⋮ | |

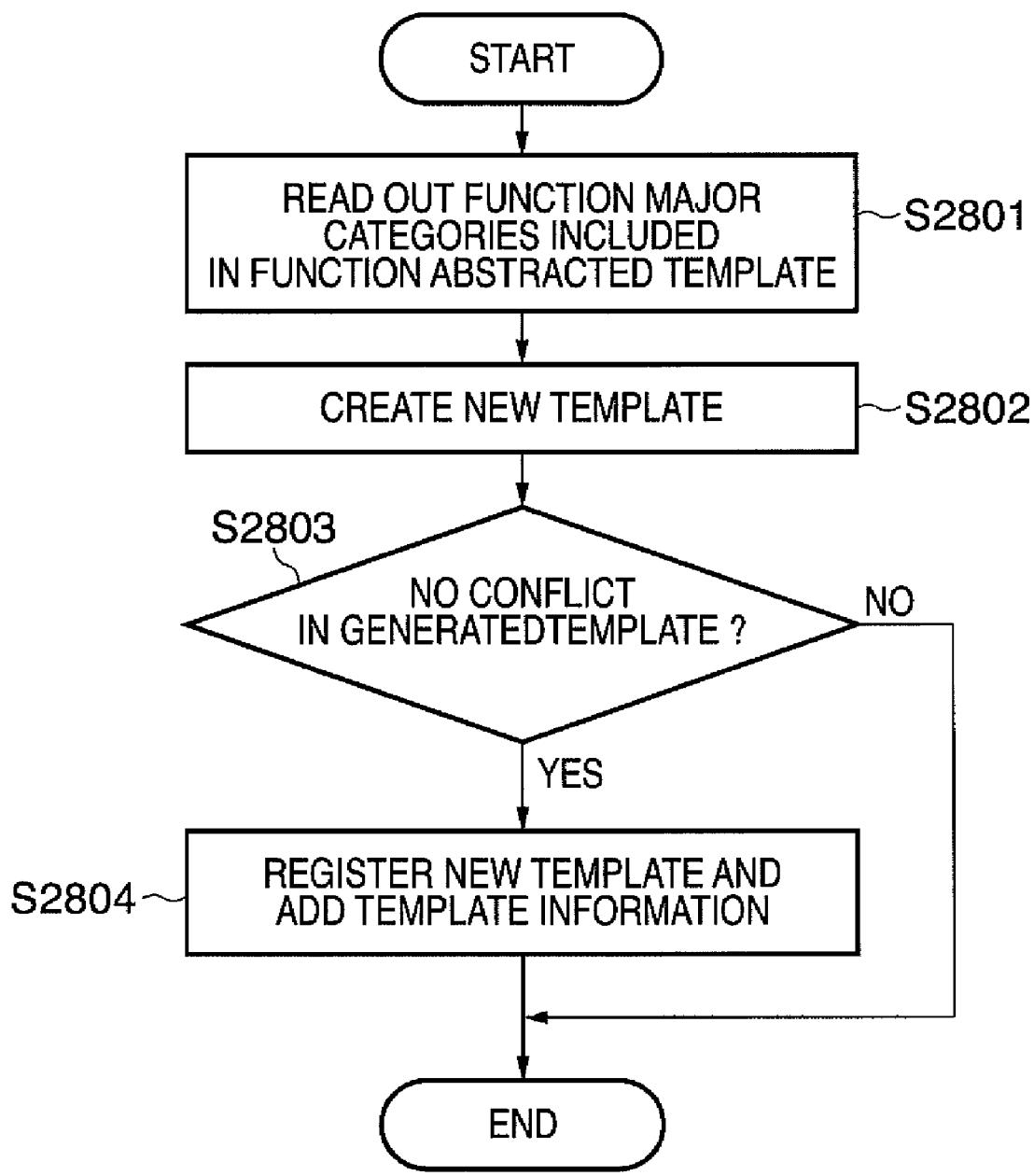

FIG. 29

NEW TEMPLATE  [?] [X]

PRINTER NAME (N) : | XXXX imageWARE Document Writer ▼ |

☐ SET PRINT STYLE ACCORDING TO FUNCTIONS OF PRINTER (E)

SELECT TEMPLATE USE MODE :

○ DEFAULT TEMPLATE USE MODE
⦿ TEMPLATE AUTOMATIC GENERATION MODE (WITH AUTOMATIC UNINSTALLATION)
○ TEMPLATE AUTOMATIC GENERATION MODE (WITHOUT AUTOMATIC UNINSTALLATION)   2901

| REGISTER FUNCTION ABSTRACTED TEMPLATE |

☐ CONFIRM REGISTRATION OF AUTOMATICALLY GENERATED TEMPLATE

FUNCTION LIST :
```
NUMBER OF PRINTABLE COPIES : 1 COPY
MAXIMUM OUTPUT PAPER SIZE : SRA3
PRINT COMBINING SHEETS WITH DIFFERENT SIZES
AND ORIENTATIONS : OK
COLOR PRINTING : OK
COLOR/MONOCHROME SWITCHING : OK
```

TEMPLATE LIST (T) :

- A4 PORTRAIT SINGLE-SIDED
- A4 LANDSCAPE SINGLE-SIDED
- A3 LANDSCAPE SINGLE-SIDED
- A4 PORTRAIT DOUBLE-SIDED STAPLE
- A4 LANDSCAPE DOUBLE-SIDED STAPLE
- A3 LANDSCAPE DOUBLE-SIDED STAPLE
- A4 PORTRAIT DOUBLE-SIDED STAPLE 2 P...
- A4 LANDSCAPE DOUBLE-SIDED STAPLE 2 P...
- A3 LANDSCAPE DOUBLE-SIDED STAPLE 2 P...
- A4 LANDSCAPE BOOKBINDING
- A3 LANDSCAPE BOOKBINDING
- A4 LANDSCAPE BOOKBINDING 2 PAGES / SHEET

[ OK ]  [ CANCEL ]  [ HELP (H) ]

FIG. 31

DETAILED SETTING OF TEMPLATE

| NAME | PAGE SETTING | FINISH-ING | PAPER SOURCE | FRONT / BACK COVER | HEAD / LAST OF FINISHING | HEADER / FOOTER |

PRINT METHOD (Y) :  ◉ SINGLE-SIDED PRINTING
　　　　　　　　　　 ○ DOUBLE-SIDED PRINTING

BOOKBINDING METHOD (K) : [ OFF ▼ ]

BINDING DIRECTION (B) : [ LEFT BINDING ▼ ]

BINDING MARGIN (G) : [ 0 ⇅ ] mm (0~50)

DOCUMENT ADJUSTMENT (J) :
　◉ REDUCE ACCORDING TO PRINT AREA SET BY BINDING MARGIN
　○ MOVE ACCORDING TO BINDING MARGIN

CHAPTER DIVISION (X) : [ OFF ▼ ]

FINISHER :
　DESIGNATION OF STAPLE (S) : [ OFF ▼ ]
　STAPLE POSITION (L) : [ UPPER LEFT ONE POSITION ▼ ]
　☐ PUNCH (N)
　☐ Z-FOLDING (Z)

[ OK ] — 3101
[ CANCEL ] — 3102

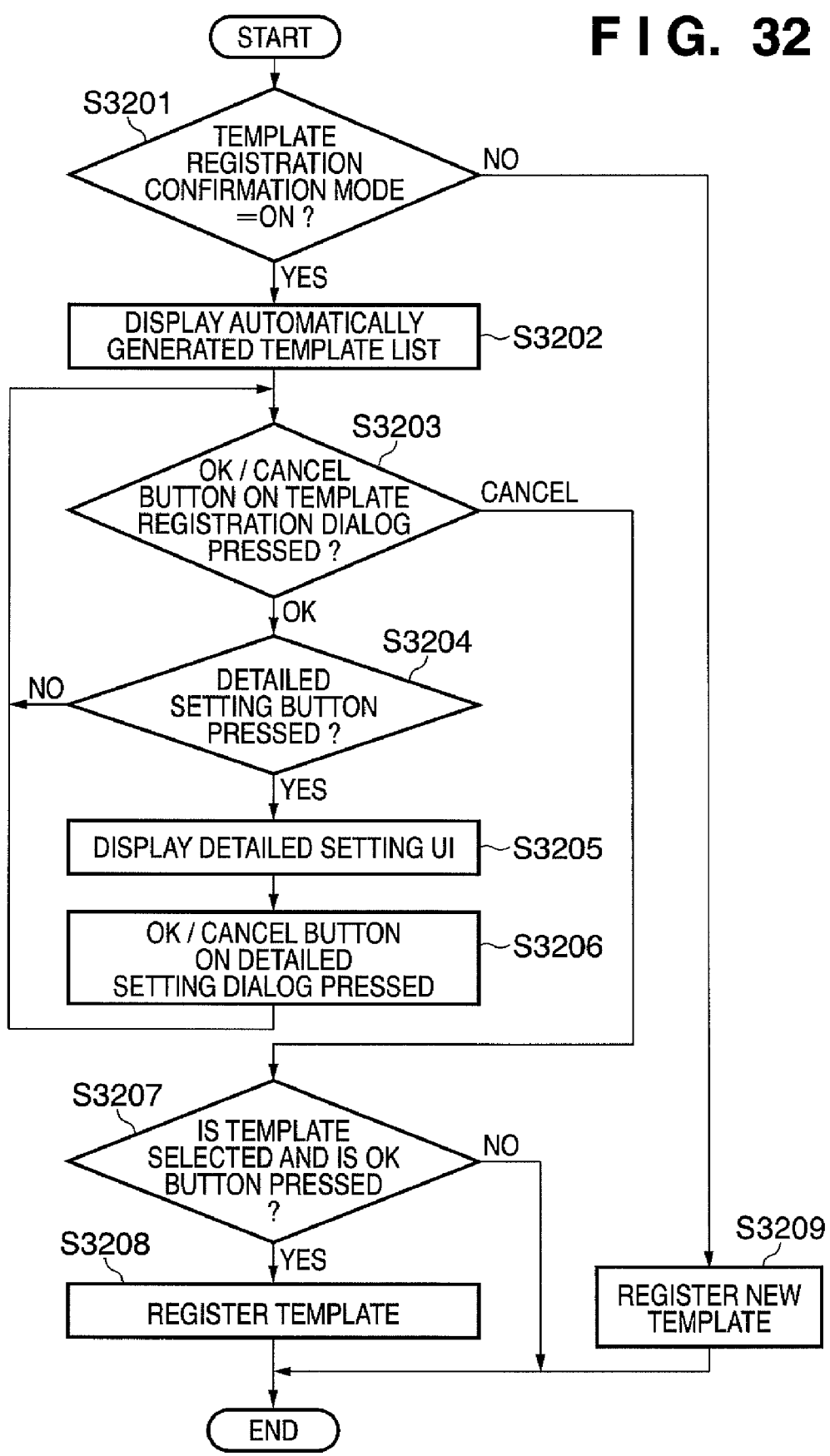
F I G. 32

FIG. 33

NEW TEMPLATE

PRINTER NAME (N): EXXXX LPB-950
☐ SET PRINT STYLE ACCORDING TO FUNCTIONS OF PRINTER (E)

FUNCTION LIST: NUMBER OF PRINTABLE COPIES: 2000 COPIES   MAXIMUM OUTPUT PAPER SIZE: A3
PRINT FOR EACH COPY: OK

TEMPLATE LIST (T):

- A4 PORTRAIT SINGLE-SIDED
- A4 LANDSCAPE SINGLE-SIDED
- A3 LANDSCAPE SINGLE-SIDED
- A4 PORTRAIT DOUBLE-SIDED STAPLE
- A4 PORTRAIT DOUBLE-SIDED STAPLE
- A4 LANDSCAPE DOUBLE-SIDED STAPLE
- A3 LANDSCAPE DOUBLE-SIDED STAPLE
- A4 PORTRAIT DOUBLE-SIDED STAPLE 2 P...
- A4 LANDSCAPE DOUBLE-SIDED STAPLE 2 P...
- A4 LANDSCAPE DOUBLE-SIDED STAPLE 2 P...
- A3 LANDSCAPE DOUBLE-SIDED STAPLE 2 P...
- A4 LANDSCAPE BOOKBINDING
- A3 LANDSCAPE BOOKBINDING
- A4 LANDSCAPE BOOKBINDING 2 PAGES / SHEET
- A3 LANDSCAPE BOOKBINDING 2 PAGES / SHEET
- A4 & A3 SINGLE-SIDED
- A4 & A3 DOUBLE-SIDED STAPLE
- A4 & A3 DOUBLE-SIDED 2 PAGES / SHEET
- A4 PORTRAIT SINGLE-SIDED INDEX SHEET
- A4 PORTRAIT SINGLE-SIDED INDEX SHEET (...
- SAME AS DOCUMENT

OUTPUT PAPER SIZE: A4
ENLARGE / REDUCE DOCUMENT ACCORDING TO OUTPUT PAPER SIZE: PORTRAIT
ORIENTATION OF OUTPUT PAPER: PORTRAIT
PAGE LAYOUT: 1 PAGE / SHEET (NORMAL)
LAYOUT ORDER: NONE
BOUNDARY LINE: NONE
ENLARGE / REDUCE DOCUMENT ACCORDING TO MARGIN: OFF
DOCUMENT LAYOUT: CENTER
PRINT METHOD: SINGLE-SIDED
TANDEM / COMBINED PRINT: OFF
BINDING DIRECTION:
LONG SIDE BINDING (LEFT)
BINDING MARGIN: 0mm
ADJUSTMENT OF DOCUMENT:
REDUCE ACCORDING TO PRINT AREA
SET BY MARGIN
DESIGNATION OF STAPLE: OFF
PUNCH: OFF
Z-FOLDING: OFF
CHAPTER DIVISION: OFF

HELP (H)
OK   CANCEL

FIG. 34

NEW TEMPLATE

PRINTER NAME (N): XXXX LPB-950

☐ SET PRINT STYLE ACCORDING TO FUNCTIONS OF PRINTER (E)

FUNCTION LIST: NUMBER OF PRINTABLE COPIES: 2000 COPIES  MAXIMUM OUTPUT PAPER SIZE: A3
PRINT FOR EACH COPY: OK

3402 →
- OUTPUT PAPER SIZE: A4
- ENLARGE / REDUCE DOCUMENT ACCORDING TO OUTPUT PAPER SIZE
- ORIENTATION OF OUTPUT PAPER: PORTRAIT
- PAGE LAYOUT: 1 PAGE / SHEET (NORMAL)
- LAYOUT ORDER: NONE
- BOUNDARY LINE: NONE
- ENLARGE / REDUCE DOCUMENT ACCORDING TO MARGIN: OFF
- DOCUMENT LAYOUT: CENTER
- PRINT METHOD: SINGLE-SIDED
- TANDEM / COMBINED PRINT: OFF
- BINDING DIRECTION:
- LONG SIDE BINDING (LEFT)
- BINDING MARGIN: 0mm
- ADJUSTMENT OF DOCUMENT:
- REDUCE ACCORDING TO PRINT AREA
- SET BY MARGIN
- DESIGNATION OF STAPLE: OFF
- PUNCH: OFF
- Z-FOLDING: OFF
- CHAPTER DIVISION: OFF

TEMPLATE LIST (T):

| A4 PORTRAIT SINGLE-SIDED | A4 LANDSCAPE SINGLE-SIDED | A3 LANDSCAPE SINGLE-SIDED | A4 PORTRAIT DOUBLE-SIDED STAPLE |
| A4 LANDSCAPE DOUBLE-SIDED STAPLE | A3 LANDSCAPE DOUBLE-SIDED STAPLE | A4 PORTRAIT DOUBLE-SIDED STAPLE 2 P... | A4 LANDSCAPE DOUBLE-SIDED STAPLE 2 P... |
| A3 LANDSCAPE DOUBLE-SIDED STAPLE 2 P... | A4 LANDSCAPE BOOKBINDING | A3 LANDSCAPE BOOKBINDING | A4 LANDSCAPE BOOKBINDING 2 PAGES / SHEET |
| A4 LANDSCAPE BOOKBINDING 2 PAGES / SHEET | A4 & A3 SINGLE-SIDED | A4 & A3 DOUBLE-SIDED STAPLE | A4 & A3 DOUBLE-SIDED 2 PAGES / SHEET |
| A4 PORTRAIT SINGLE-SIDED INDEX SHEET | A4 PORTRAIT SINGLE-SIDED INDEX SHEET (... | SAME AS DOCUMENT  ← 3401 | A4 LANDSCAPE SINGLE-SIDED C-FOLDING |

[ OK ]  [ CANCEL ]  [ HELP (H) ]

INFORMATION PROCESSING APPARATUS, METHOD, AND PROGRAM PRODUCT WITH OPERATION FOR EDITING TEMPLATE DESIGNATING PRINTER FUNCTIONS

BACKGROUND OF THE INVENTION

1. Field of the Invention

The present invention relates to an information processing technique for editing a template used to designate functions to be executed by a printing apparatus upon printing.

2. Description of the Related Art

In general, when the types of data such as characters, tables, images, and the like are different, the structures for defining data, and edit operations for data are different. For this reason, different application programs are prepared in correspondence with the types of data.

The user who uses data selectively uses applications according to the types of data like a text processing program upon editing characters, a spreadsheet program upon editing tables, and an image edit program upon editing images.

However, documents to be created by the user are not configured by only one type of data such as only characters, only tables, or only images, but they are often configured by a plurality of types of data such as characters and tables, characters and images, and so forth.

For this reason, upon creating a document including such plurality of types of data, conventionally, the user prints respective data using print functions of various applications, and combines the printed materials in a desired order, so as to obtain such a document.

Alternatively, the user obtains such a document using an integrated application (for example, Office suite) which includes various applications and configures one document by combining data generated by these applications. This is because the user can easily combine data generated by respective applications into one document using the integrated application.

The conventional integrated application comprises a template function which allows the user to register in advance, as a template, designations associated with functions to be executed by a printing apparatus (designations associated with print settings) upon printing edited document data. As the designations associated with print settings that can be registered using the template function, for example, a page layout, output paper, single-sided/double-sided/bookbinding, finishing method (punch, staple), and the like are prepared.

For this reason, even when new document data is created, the user can easily make designations associated with the print settings of that document data by selecting only a desired one of templates of some patterns, which are registered in advance, using the template function.

Furthermore, since the template can be converted into a file, and the converted file can be saved, the user can create a new template or can change the existing template.

Moreover, the template function comprises an import/export function. With this function, the user can export or import a template to or from another PC.

In addition, a method of saving designations associated with print settings of document data, the edit processing of which is in progress, as a template intact in association with the template function has been proposed (see Japanese Patent Laid-Open No. 2004-252665). Using this method, operability upon creating a template can be improved.

Japanese Patent Laid-Open No. 9-26867 discloses a technique which allows an information processing apparatus to dynamically change the configuration window of a printing apparatus in a printer driver based on acquired configuration information of the printing apparatus.

However, in case of the conventional template function, when the function of the printing apparatus is added, the user needs to execute the edit operation of the template on the integrated application while recognizing the added function.

Furthermore, Japanese Patent Laid-Open No. 9-26867 does not disclose any technique for generating the aforementioned template using the acquired configuration information.

In this way, upon changing the functions of the printing apparatus, since the conventional template function requires the user to execute many operations to cope with such change, the operation load is heavy.

SUMMARY OF THE INVENTION

The present invention has been made in consideration of the aforementioned problems, and has as its object to allow the user to easily execute a template edit operation even when the functions of a printing apparatus are changed.

An information processing apparatus according to the present invention comprises the following arrangement. That is, an information processing apparatus, which is connected to a printing apparatus and edits a template that designates functions to be executed by the printing apparatus upon printing, comprising:

a specifying unit configured to specify information associated with functions to be registered based on functions of the printing apparatus which can be selected by the information processing apparatus; and a generation unit configured to generate a template that designates execution of print processing using at least the functions specified by the specifying unit, wherein the template including a plurality of parameter to designate functions to be executed by the printing apparatus.

According to the present invention, even when the functions of the printing apparatus are changed, the user can easily execute the template edit operation.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are tables showing a list of book attributes;

FIG. 5 is a table showing a list of chapter attributes;

FIG. 6 is a table showing a list of page attributes;

FIG. 13 is a view showing a display example of a "template selection" window 1301;

FIG. 14 is a view showing a display example of a "template setting" window 1401;

FIG. 15 is a view showing an example of a template edit dialog;

FIG. 18 is a view showing an example of a "register function abstracted template" dialog;

FIG. 19 is a view showing the concept of function major categories;

FIG. 20 is a table showing the correspondence between the function major categories and their registration functions;

FIG. 21 is a view showing an example of a function abstracted template;

FIG. 25 is a table showing an example of template information;

FIG. 28 is a flowchart showing details of the template automatic generation processing;

FIG. 29 is a view showing an example of a UI window to which a template registration confirmation mode is added as an operation mode to the new template dialog (FIG. 17);

FIG. 30 is a view showing an example of a UI window displayed when the registration confirmation mode is ON;

FIG. 31 is a view showing an example of a "detailed setting of template" dialog;

FIG. 32 is a flowchart showing the sequence of new template registration processing upon confirming registration of a template;

FIG. 33 is a view showing templates already registered in the bookbinding application 104; and FIG. 34 is a view showing a state in which a new template is registered.

DESCRIPTION OF THE EMBODIMENTS

Preferred embodiments of the present invention will now be described in detail in accordance with the accompanying drawings.

[First Embodiment]

<1. Overview of Document Processing System>

An overview of a document processing system according to the present invention will be described below with reference to FIGS. 1 to 13. Note that this document processing system includes an electronic document writer which converts application data created by general applications into an electronic document file, and a bookbinding application which provides functions of editing the electronic document file. According to this document processing system, document data that combines created application data can be created and edited, and such document data can be efficiently created and edited.

<1.1 Functional Arrangement of Document Processing System and Operations of Respective Units>

Figure 1:
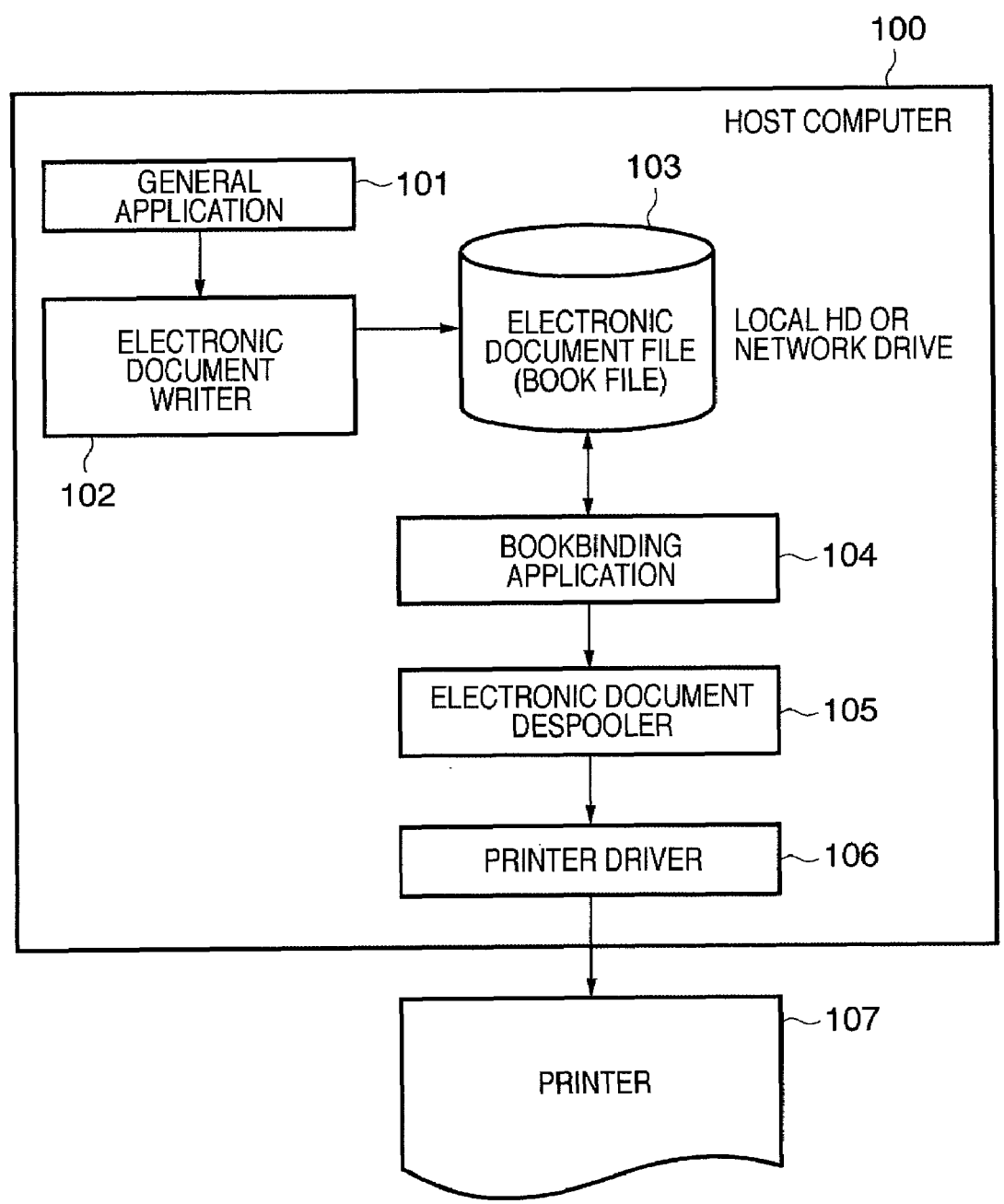
FIG. 1 is a block diagram showing the functional arrangement of a document processing system 100.

FIG. 1 is a block diagram showing the functional arrangement of the document processing system of this embodiment. The document processing system is implemented by a digital computer 100 (to be also referred to as a host computer hereinafter) as an embodiment suited to an information processing apparatus of the present invention.

A general application 101 shown in FIG. 1 includes application programs which provide functions of wordprocessing, spreadsheet, photoretouch, draw or paint, presentation, text editing, and the like. These application programs have print functions with respect to an OS (operating system).

Note that each application program uses a predetermined interface (generally called a GDI) provided by the OS upon printing application data such as created text data, image data, or the like. More specifically, the general application 101 transmits predetermined output commands having a format depending on the OS to an output module of the OS which provides the aforementioned interface, so as to print the created application data.

Upon reception of the output commands, the output module converts the output commands into a format that a printing apparatus such as a printer or the like can process, and outputs the converted commands (called DDI functions).

Since the format that the printing apparatus can process changes depending on the types, manufacturers, models, and the like of printing apparatuses, a printer driver is provided for each printing apparatus. For this reason, the OS generates print data by converting the command using the corresponding printer driver, and bounds the generated print data by a JL (Job Language), thus generating a print job.

When Microsoft Windows is used as the OS, a module called GDI (Graphic Device Interface) corresponds to the aforementioned output module.

An electronic document writer 102 is a software module which is prepared by improving the aforementioned printer driver, and is provided to implement the document processing system 100. Note that the electronic document writer 102 does not aim at converting output commands into a format that a specific printing apparatus can process but it aims at converting output commands into a format that a bookbinding application 104 and printer driver 106 can process.

A format (to be referred to as an electronic document format hereinafter) after conversion by this electronic document writer 102 is not particularly limited as long as it can express a document for each page using a detailed form. As an example of the electronic document format, a PDF format of Adobe Systems, SVG format, and the like can be used.

In order to use the electronic document writer 102 from the general application 101, the user designates the electronic document writer 102 as a printer driver used in output, and then executes printing. However, an electronic document file itself created by the electronic document writer 102 does not have a complete format as an electronic document file.

For this reason, the bookbinding application 104 designates the electronic document writer 102 as a printer driver, and conversion of application data into an electronic document file is executed under the management of the electronic document writer 102. The bookbinding application 104 completes a new incomplete electronic document file generated by the electronic document writer 102 as an electronic document file having a format to be described later.

When such a difference needs to be discriminated clearly, a file created by the electronic document writer 102 will be referred to as an "electronic document file", and an electronic document file to which a structure is given by the bookbinding application 104 will be referred to as a "book file" hereinafter. When such a difference need not be particularly distinguished, any of application data generated by each application program an electronic document file, and a book file will be referred to as a document file (or document data).

When the user designates the electronic document writer 102 as a printer driver, and instructs the general application 101 to execute printing, application data is converted into the electronic document format for each page defined by the general application 101. The converted data is stored as an electronic document file 103 in a storage medium such as a hard disk or the like. Note that a page defined by the general application 101 will be referred to as a logical page or document page hereinafter.

Note that the storage medium that stores the electronic document file 103 is not limited to the hard disk. For example, that storage medium may be a local drive of the host computer which implements the document processing system 100 of this embodiment, or may be a drive provided on a network when the document processing system 100 is connected to the network.

The bookbinding application 104 provides functions that allow the user to import the electronic document file (or book file) 103 and edit the imported file. However, the bookbinding application 104 does not provide any function of editing the contents of each page, but it provides functions of editing the structures of chapters and a book configured to have a page as a minimum unit.

Upon printing the book file 103 edited by the bookbinding application 104, the bookbinding application 104 launches an electronic document despooler 105. The electronic document despooler 105 is a program module installed in the host computer 100 together with the bookbinding application 104. This module is used to output rendering data to the printer driver 106 upon printing the book file used by the bookbinding application 104.

The electronic document despooler 105 reads out the designated book file from the hard disk, generates output commands suited to the aforementioned output module of the OS so as to print each page in the format described in the book file, and outputs the output commands to the output module (not shown). In this case, the printer driver 106 of a printer 107 used as a printing apparatus is designated as a printer driver.

The aforementioned output module converts the received output commands into device commands, and outputs the device commands to the printer driver 106 of the designated printer 107. The printer driver 106 converts the device commands into a print job of a page description language or the like that the printer 107 can interpret.

The converted print job is transmitted from the printer driver 106 to the printer 107 via a system spooler (not shown), and the printer 107 prints an image according to the print job.

<1.2 Hardware Arrangement of Document Processing System 100>

Figure 2:
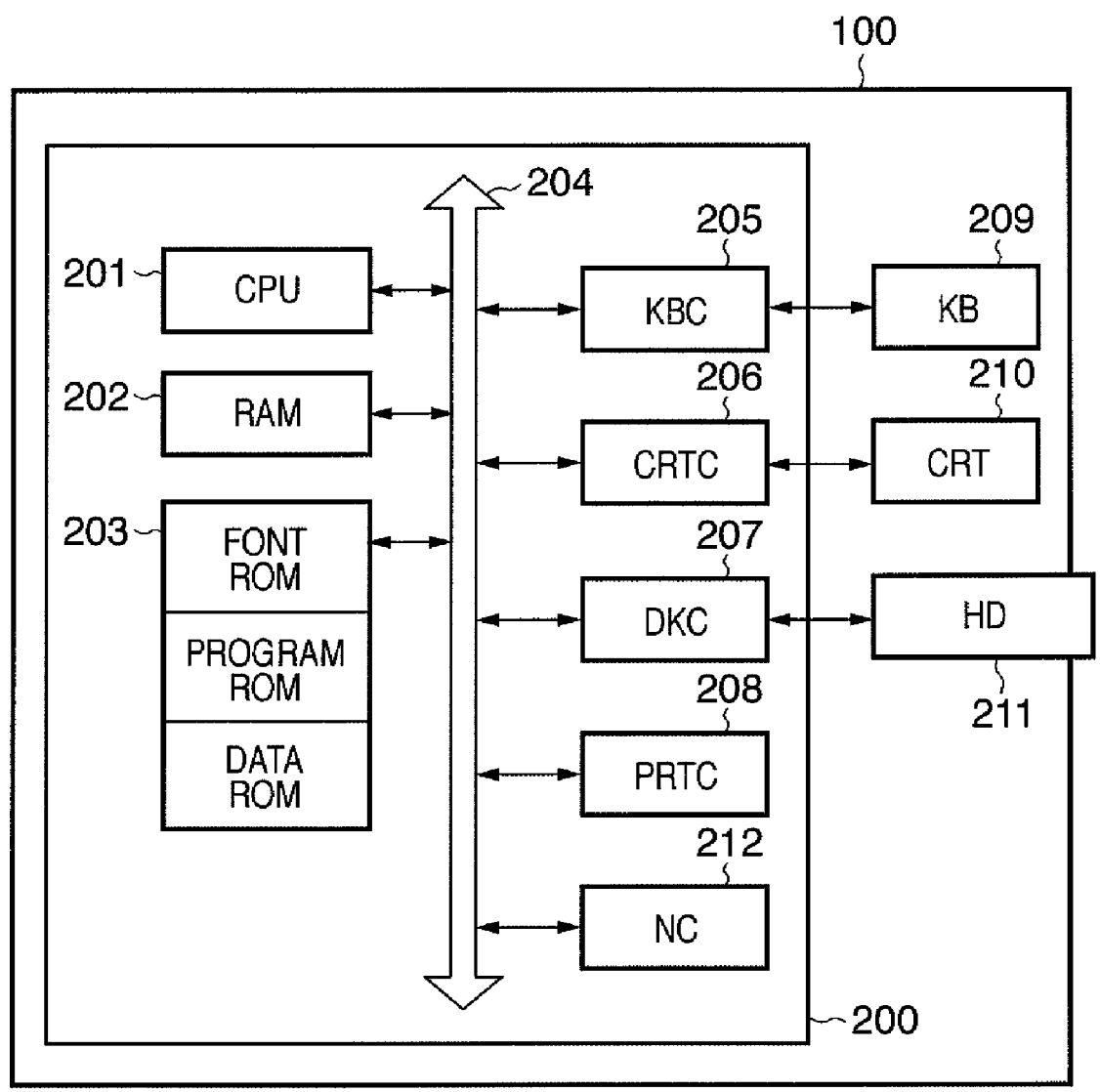
FIG. 2 is a block diagram showing the hardware arrangement of the document processing system 100.

FIG. 2 is a block diagram showing the hardware arrangement of the document processing system 100. Referring to FIG. 2, a CPU 201 executes programs such as the OS, general application 101, bookbinding application 104, and the like, which are stored in a program ROM of a ROM 203 or which are loaded from a hard disk 211 onto a RAM 202. In this way, the CPU 201 implements the software configuration shown in FIG. 1 and the sequences of flowcharts to be described later.

The RAM 202 serves as a main memory, work area, and the like of the CPU 201. A keyboard controller (KBC) 205 controls key inputs from a keyboard 209 and a pointing device (not shown). A CRT controller (CRTC) 206 controls display on a CRT display 210. A disk controller (DKC) 207 controls accesses to the hard disk 211 which stores a boot program, various applications, font data, user files, edit files (to be described later), and the like, a Floppy® disk, and the like. A PRTC 208 controls exchange of signals with the connected printer 107. An NC 212 is connected to a network, and executes communication control processing with other devices connected to the network.

<1.3 Data Format of Book File>

The data format of the book file 103 will be described below. The book file 103 has a layer structure of three layers that imitate a book of paper media. An upper layer is called "book", imitates a copy of book, and defines general attributes of that book. An intermediate layer below the upper layer corresponds to chapters of a book, and is called "chapter". For each chapter, their attributes are defined. A lower layer is called "page", and corresponds to pages defined by the application program. For each page, their attributes are defined. One book may include a plurality of chapters, and one chapter may include a plurality of pages.

Figure 3A:
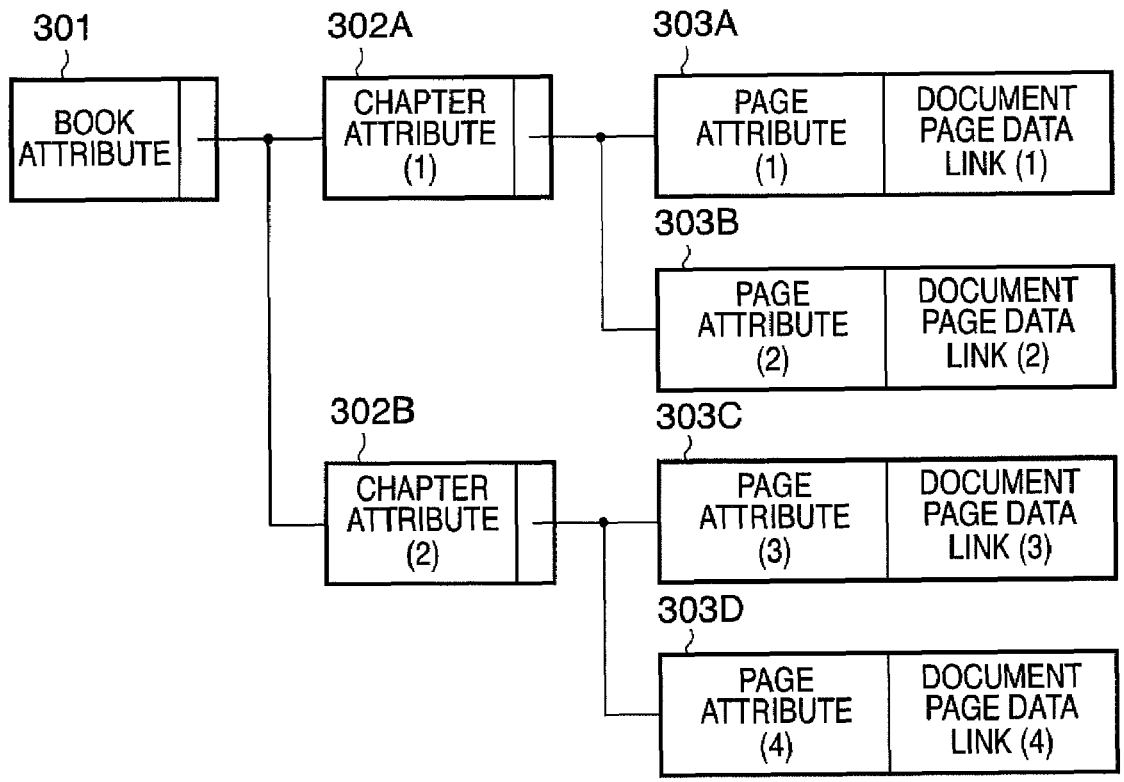
FIGS. 3A and 3B are views showing an example of the format of a book file.

FIG. 3A is a view showing an example of the format of the book file 103. In the example of FIG. 3A, a book, chapters, and pages in the book file are indicated by corresponding nodes.

One book file includes one book. Since the book and chapters correspond to the concepts required to define the structure of a book, they include defined attribute values and links to the lower layers as their entities. Each page has each page data output by the application program as its entity. For this reason, each page includes an entity of a document page (document page data) and links to respective document page data in addition to its attribute values.

Note that a print page upon outputting onto, for example, a paper medium may include a plurality of document pages. This structure is not indicated by a link but by attributes in the book, chapter, and page layers.

As shown in FIG. 3A, a book 301 is defined with a book attribute, and links to two chapter attributes 302A and 302B. With these links, the chapter attributes 302A and 302B are included in the book 301.

Figure 3B:
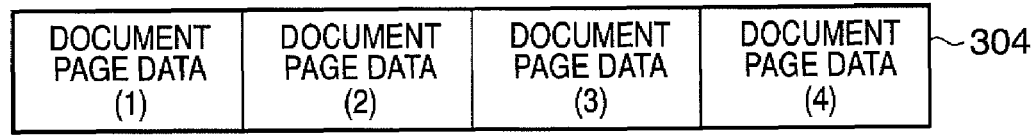

The chapter attribute 302A links to page attributes 303A and 303B, and includes these pages. The page attributes 303A and 303B include defined attribute values, and also links to document page data (1) and (2) as their entities. These links point to data (1) and (2) of document page data 304, as shown in FIG. 3B (the entities of the page attributes 303A and 303B are the document page data (1) and (2)).

<1.4 Types of Attributes of Book File>

Details of attributes defined in the book file shown in FIGS. 3A and 3B will be described below. FIGS. 4A and 4B show a list of book attributes. As for items which can be defined to be redundant to those of lower layers, the attribute values of lower layers are preferentially adopted. For this reason, as for items included in only book attributes, values defined in the book attributes are effective throughout the book. However, as for items redundant to those of lower layers, such values have a meaning as prescribed values when these items are not defined in lower layers. Note that each item shown in FIGS. 4A and 4B does not correspond to its first item in practice, but it may often include a plurality of related items.

FIG. 5 shows a list of chapter attributes, and FIG. 6 shows a list of page attributes. The relationship between the chapter and page attributes is the same as that between the book attributes and those of lower layers.

As can be seen from FIGS. 4A to 6, items unique to the book attributes are six items: "print method", "bookbinding detail", "front/back cover", "index sheet", "interleaving sheet", and "chapter division". These items are defined throughout the book.

As the "print method" attribute, three values "single-sided printing", "double-sided printing", and "bookbinding printing" can be designated. Note that "bookbinding printing" is a method of printing in a format in which a bundle of paper sheets, the number of which is designated separately, is formed, the bundle is folded into two, and that bundle is bound, thus attaining bookbinding.

As the "bookbinding detail" attribute, a spread direction, the number of sheets which form a bundle, and the like can be designated when "bookbinding printing" is designated.

As the "front/back cover" attribute, upon printing an electronic document file bound as a book, addition of a paper sheet which serves as front and back covers, and print contents on the added paper sheet can be designated.

As the "index sheet" attribute, insertion of an index sheet with a tab separately prepared in the printing apparatus as a division of each chapter, and print contents on an index (tab) can be designated. This attribute is valid when the printing apparatus used comprises an inserter which has an insert function of inserting paper sheets prepared independently of print paper sheets to desired positions, or when a plurality of paper cassettes are available. The same applies to the "interleaving sheet" attribute.

As the "interleaving sheet" attribute, insertion of a paper sheet fed from an inserter or a paper cassette as a division of each chapter, a paper source upon inserting each interleaving sheet, and the like can be designated.

As the "chapter division" attribute, use of a new paper sheet, use of a new print page, nothing to do, and the like can be designated. In a single-sided printing mode, use of a new paper sheet and that of a new print page have the same meaning. In a double-sided printing mode, if "use of new paper sheet" is designated, successive chapters are never printed on a single paper sheet. However, if "use of new print page" is designated, successive chapters may be printed on the obverse and reverse faces of a single paper sheet.

As for the chapter attributes, there is no item unique to "chapter", and all items are redundant to those of the book attribute. Therefore, if the definitions in the chapter attributes are different from those in the book attributes, the values defined in the chapter attributes are preferentially used. Items common to only the book attributes and chapter attributes are five items: "paper size", "paper orientation", "N-up printing designation", "scaling", and "discharge method".

Of these items, the "N-up printing designation" attribute is an item used to designate the number of document pages to be included per print page. Layouts that can be designated include 1×1, 1×2, 2×2, 3×3, 4×4, and the like.

The "discharge method" attribute is an item used to designate whether or not to apply staple processing to discharged paper sheets. The validity of this attribute depends on whether or not the printing apparatus used has a staple function.

Items unique to the page attributes include "page rotation", "zoom", "layout designation", "annotation", "page division", and the like.

The "page rotation" attribute is an item used to designate a rotation angle upon laying out a document page on a print page.

The "zoom" attribute is an item for designating the zoom ratio of a document page. The zoom ratio is designated to have the size of a virtual logical page area as 100%. The virtual logical page area means an area occupied per document page, when document pages are laid out according to "N-up printing designation" or the like. For example, in case of 1×1, the virtual logical page area corresponds to one print page. In case of 1×2, the virtual logical page area corresponds to an area obtained by reducing the respective sides of one print page to about 70%.

Attributes common to the book, chapter, and page attributes include a "watermark" attribute and "header/footer" attribute. Note that a watermark is an image, character string, or the like, which is printed to overlap data created by the application program, and is designated independently.

A header and footer are watermarks to be printed on the top and bottom margins of each page. As the header and footer, items that can be designated using variables such as a page number, date, and the like are prepared. Note that the contents that can be designated in the "watermark" attribute and "header/footer" attribute in the chapter and page attributes are common, but are different in the book attributes.

In the book attributes, the contents of the watermark and the header and footer can be designated, and how to print the watermark and the header and footer can be designated throughout the book. On the other hand, in the chapter and page attributes, whether or not to print the watermark and the header and footer set in the book attributes in a corresponding chapter and page can be designated.

<1.5 Description of Various Processes in Document Processing System 100>

Various processes from creation of an electronic document file until output of the file to the printer 107 in the document processing system 100 will be described below.

<1.5.1 Description of Electronic Document File Creation Processing>

Figure 7:
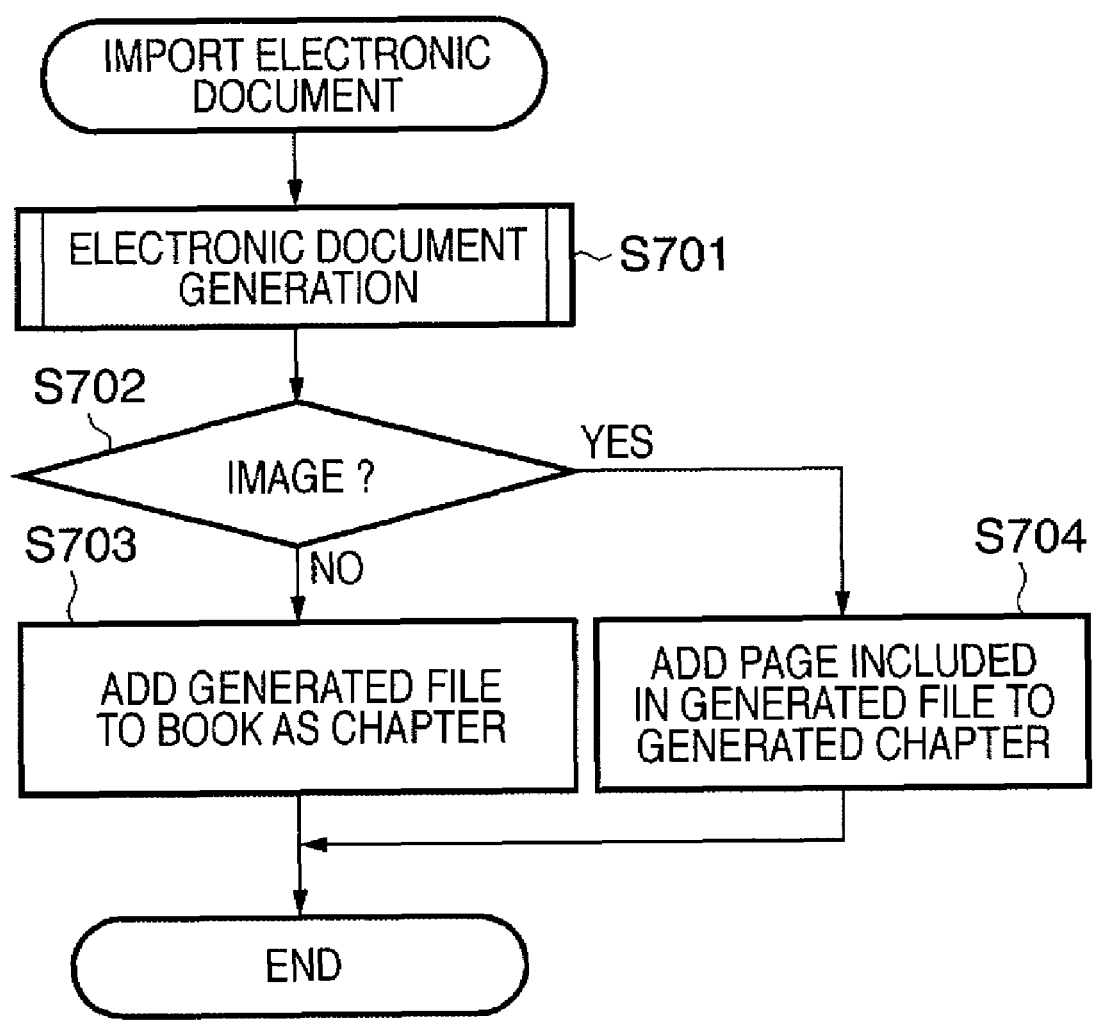
FIG. 7 is a flowchart showing the sequence of electronic document file creation processing.

The electronic document file creation processing will be described first. FIG. 7 is a flowchart showing the sequence of the electronic document file creation processing.

The application program used to generate designated application data is launched, and the electronic document writer 102 is designated as a printer driver to print out the application data, thereby converting the application data into an electronic document file (step S701).

Upon completion of conversion, it is checked if the converted application data is image data (step S702). Under the Windows OS, this checking can be done based on a file extension of application data. For example, when an extension is "bmp", it is determined that data is Windows bitmap data; when it is "jpg", it is determined that data is JPEG-compressed image data; and when it is "tiff", it is determined that data is image data of a tiff format. In case of such image data, an electronic document file can be directly generated from the image data without launching the application program unlike in step S701. For this reason, the process in step S701 can be skipped.

If it is determined that the application data is not image data, the electronic document file generated in step S701 is added as a new chapter to a book of a currently opened book file (step S703). As the chapter attributes, as for values of the items common to the book attributes, values of the book attributes are copied. As for values of the items which are not common to the book attributes, prescribed values prepared in advance are set.

On the other hand, if it is determined in step S702 that the application data is image data, no new chapter is added, and document pages included in the electronic document file generated in step S701 are added to a designated chapter in principle (step S704). However, when a new book file is created, a new chapter is created, and document pages of the electronic document file are added as those which belong to that chapter.

As the page attributes, as for values of items common to the attributes of upper layers, these attribute values are set. As for attribute values which are defined in the application data and are inherited to the electronic document file, these values are set. For example, when N-up printing or the like is designated in the application data, that attribute value is inherited. In this manner, a new book file is created or a new chapter is added.

Figure 8:
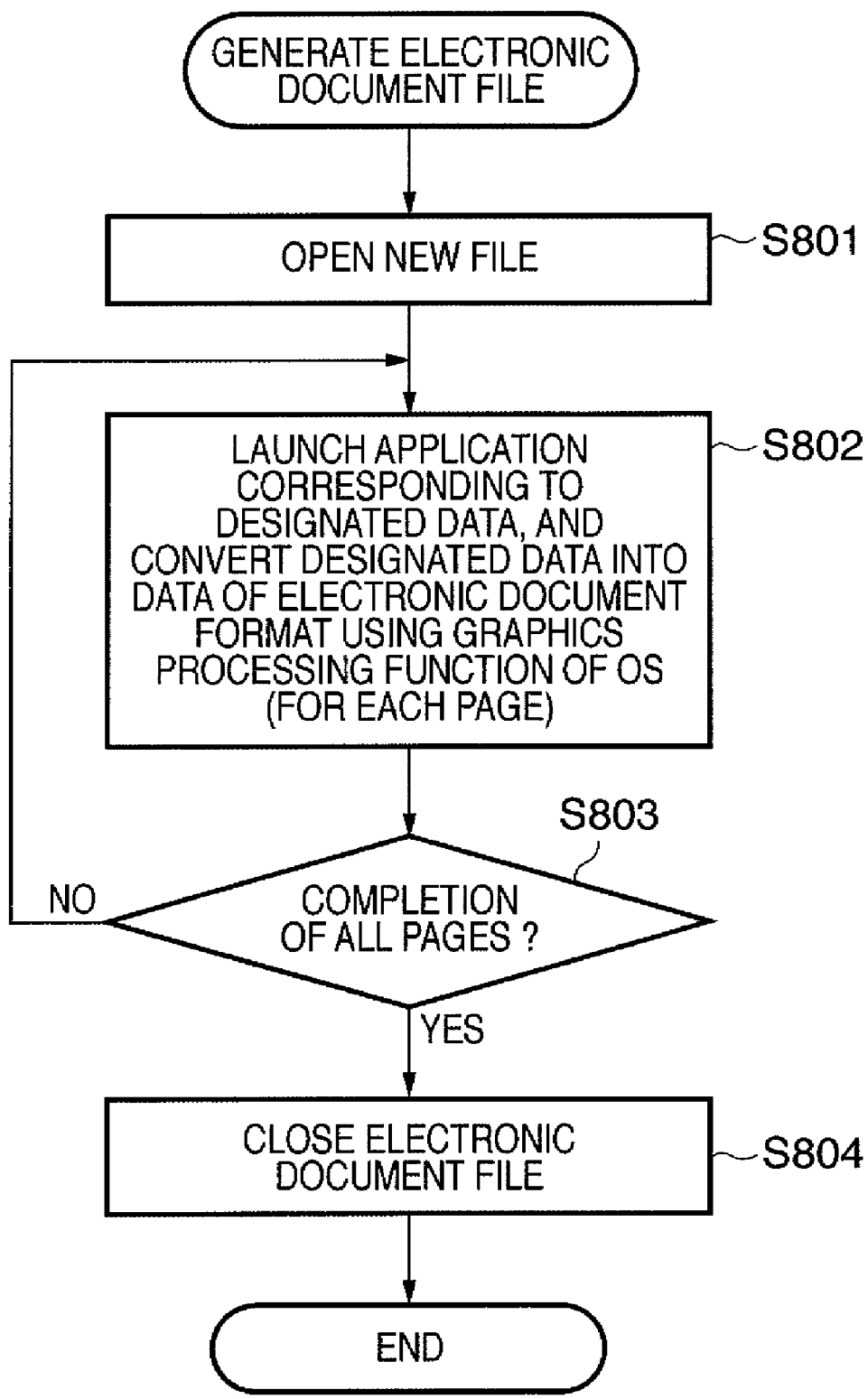
FIG. 8 is a flowchart showing the detailed sequence of the electronic document file creation processing.

FIG. 8 is a flowchart showing the detailed sequence of the processing executed when the electronic document writer 102 generates an electronic document file in step S701 shown in FIG. 7.

In step S801, a new electronic document file is created and opened.

In step S802, the application program corresponding to the designated application data is launched, and the electronic document writer 102 is designated as a printer driver, thereby transmitting output commands to the output module of the OS. The output module converts the received output commands into an electronic document format using the electronic document writer 102, and outputs the converted commands. The output destination of the output commands is the electronic document file opened in step S801.

It is checked in step S803 if conversion is complete for all the designated application data. If it is determined that conversion is complete, the electronic document file is closed in step S804. The electronic document file generated by the electronic document writer 102 is a file including the entities of document page data shown in FIG. 3B.

<1.5.2 Description of Book File Creation Processing>

The book file creation sequence by the bookbinding application 104 and electronic document writer 102 will be described below. The book file creation sequence is implemented as part of the book file edit operation by the bookbinding application 104.

Figure 9:
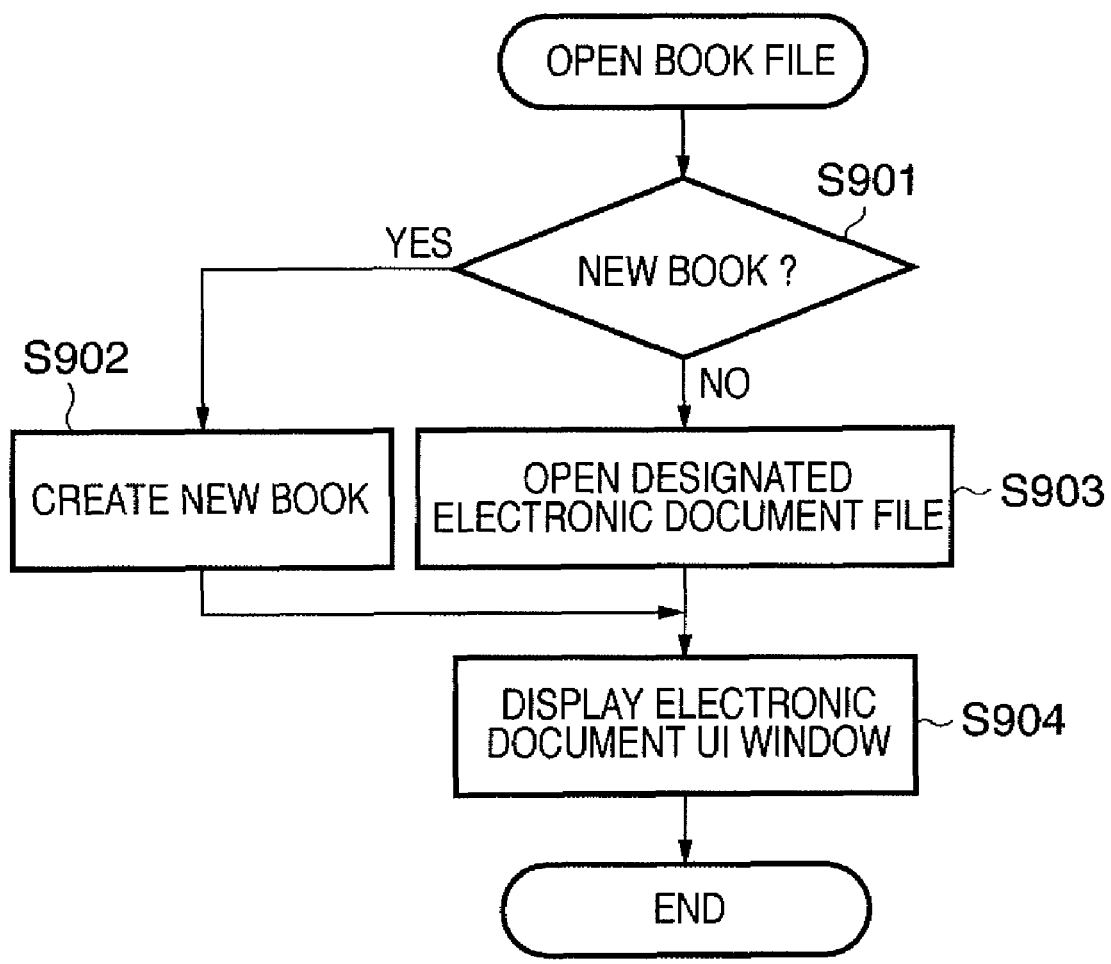
FIG. 9 is a flowchart showing the sequence of processing executed when a bookbinding application 104 opens a book file.

FIG. 9 is a flowchart showing the sequence executed when the bookbinding application 104 opens a book file. The bookbinding application 104 checks if a book file to be opened is a new book file to be created or an existing book file (step S901). If the book file to be opened is a new book file to be created, the bookbinding application 104 creates a new book file including no chapter (step S902).

In the example of FIGS. 3A and 3B, the new book file to be created has only the book 301 and no links to chapter nodes. As the book attributes, an attribute set prepared in advance for a new book file is applied. Then, the bookbinding application 104 displays a user interface (UI) window used to edit the new book file (step S904).

Figure 10:
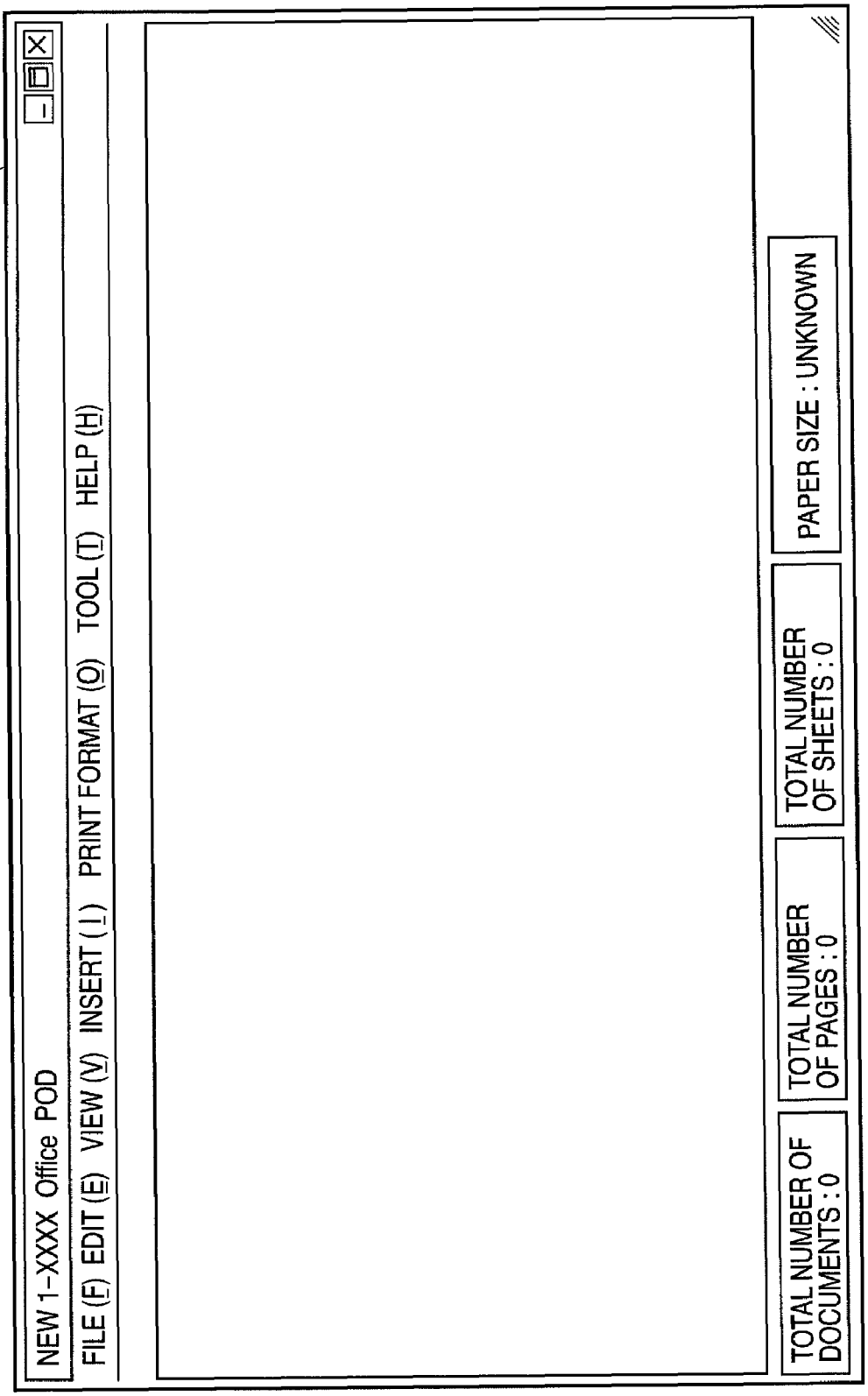
FIG. 10 is a view showing an example of a UI window upon creating a new book file.

FIG. 10 shows an example of the UI window displayed when a new book file is created. In this case, since the book file has no practical contents, nothing is displayed on a UI window 1000.

On the other hand, if the book file to be opened is an existing book file, the bookbinding application 104 opens the designated book file (step S903), and displays a user interface (UI) window according to the structure, attributes, and contents of that book file.

Figure 11:
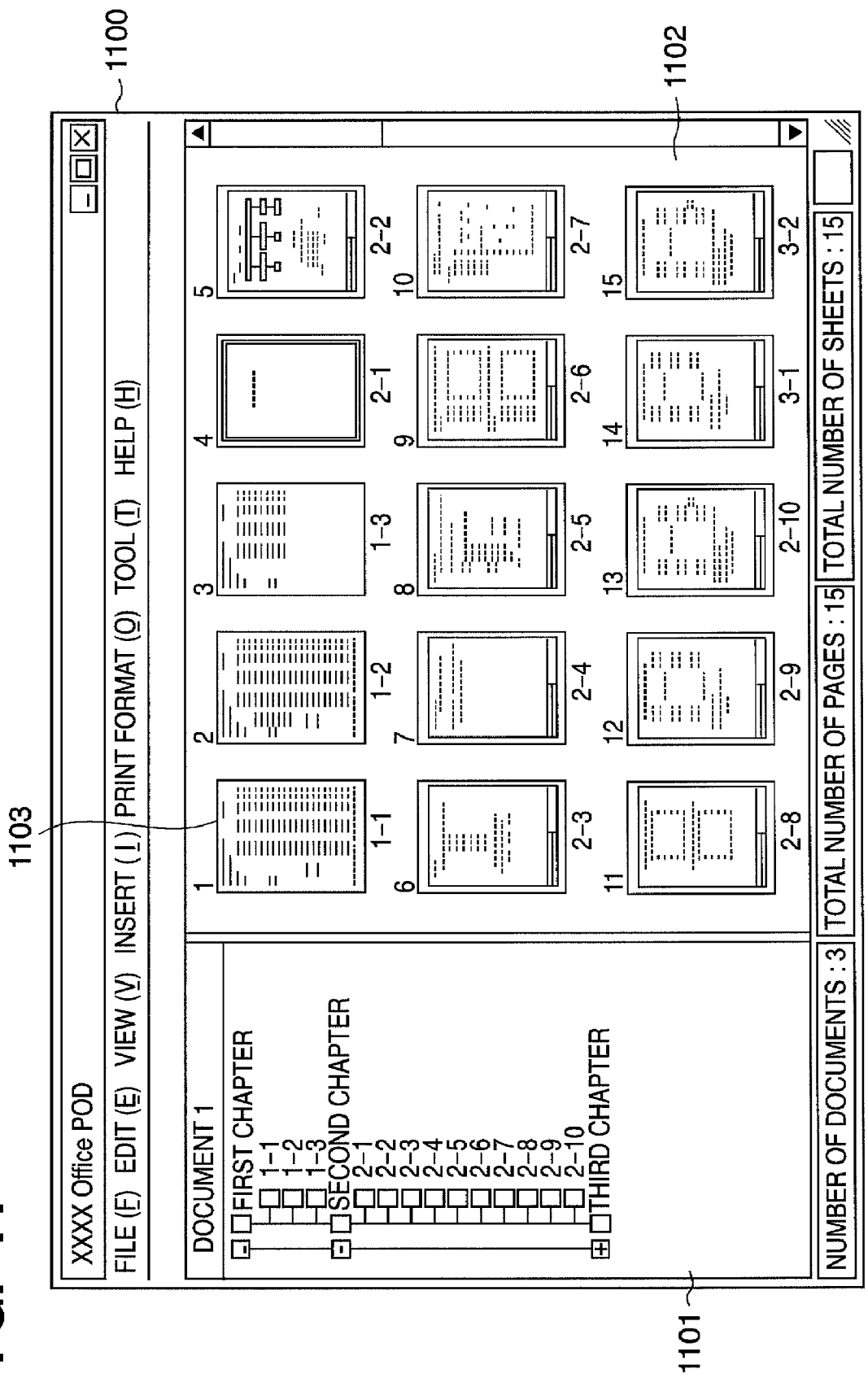
FIG. 11 is a view showing an example of a UI window which displays a book file designated from existing book files.

FIG. 11 shows an example of the UI window which displays the designated book file of the existing book files. The UI window 1000 includes a tree area 1101 indicating the structure of the book, and a preview area 1102 which displays a printed state. The tree area 1101 displays chapters included in the book, and pages included in the chapters using a tree structure shown in FIG. 3A. The pages displayed on the tree area 1101 are document pages. The preview area 1102 displays the contents of print pages in a reduced scale. The display order of the pages reflects the structure of the book.

To the opened book file, application data converted into an electronic document file by the electronic document writer 102 can be added as a new chapter. This function will be referred to as an electronic document import function hereinafter. By importing an electronic document file to the new book file created in the sequence shown in FIG. 9, an entity is given to the book file. This function is launched when the user drags and drops application data on the window shown in FIG. 11.

Note that three different display methods are prepared for the preview area 1102 in accordance with a user's designation.

The first display method is a so-called document view mode that displays document pages intact. In this document view mode, the contents of document pages which belong to the book of interest are displayed in a reduced scale. However, no layout is reflected to the display of the preview area 1102.

The second display method is a print view mode. In this print view mode, the document pages are displayed on the preview area 1102 while reflecting the layout of the document pages.

The third display method is a simple print view mode. In this simple print view mode, the contents of the document pages are not reflected to the display of the preview area, but only the layout is reflected.

<1.5.3 Description of Book File Edit Processing>

The book file edit processing by the bookbinding application 104 will be described below. For the book file generated in the aforementioned sequence, the following edit operations can be made for chapters and pages.

add new chapter or page
    delete
    copy
    cut
    paste
    move
    change chapter name
    reassign page number names
    insert front cover
    insert interleaving sheet
    insert index sheet
    page layout for each document page In addition, an operation for undoing an edit operation which was made once, and an operation for redoing an operation which was undone are available. With these edit functions, for example, edit operations such as integration of a plurality of book files, re-layout of chapters and pages in a book file, deletion of chapters and pages in a book file, layout change of each document page, insertion of an interleaving sheet and index sheet, and the like are allowed.

Upon making these operations, the operation results are reflected to the attributes shown in FIGS. 4 and 5, or are reflected to the structure of the book file. For example, upon making an addition operation of a new blank page, the blank page is inserted to a designated position. This blank page is handled as a document page. Upon changing the layout for each document page, the change contents are reflected to the print method and the attributes such as "N-up printing", "front/back cover", "index sheet", "interleaving sheet", and "chapter division".

<1.5.4 Description of Book File Output Processing>

The book file output processing will be described below. The book file which is created and edited, as described above, is to be printed out as a final purpose. When the user selects a file menu from the UI window 1000 of the bookbinding application shown in FIG. 11, and then selects "print" from that menu, the book file is printed out by the designated printing apparatus. In this case, the bookbinding application 104 generates a job ticket based on the currently opened book file, and passes that job ticket to the electronic document despooler 105.

On the other hand, the electronic document despooler 105 converts the job ticket into output commands of the OS (e.g., GDI functions of Windows), and transmits them to the output module (e.g., GDI). The output module generates commands suited to the printer 107 using the designated printer driver 106, and transmits the generated commands to the printer 107.

Note that the job ticket is data having a document page as a minimum unit. The structure in the job ticket defines the layout of each document page on a paper sheet. One job ticket is issued per job.

The job ticket includes a document node as an uppermost node, which defines the attributes of the entire document, for example, double-sided/single-sided printing and the like. The job ticket includes paper nodes below the document node, and the paper nodes include attributes such identifiers of paper sheets to be used, designation of paper sources in a printer, and the like.

To each paper node, a sheet node to be printed on that paper sheet belongs. One sheet node corresponds to one paper sheet. To each sheet node, a print page (physical page) belongs. In the single-sided printing mode, one physical page belongs to one sheet node. In the double-sided printing mode, two physical pages belong to one sheet node. To each physical page, document pages to be laid out on that physical page belong. As an attribute of each physical page, the layout of document pages is included.

The electronic document despooler 105 converts the aforementioned job ticket to output commands to the output module.

<1.5.5 Description of Template Selection Processing>

The template selection processing in the bookbinding application 104 will be described below. As described above, the bookbinding application 104 can create document data with the attributes shown in FIGS. 4A and 4B by making designations associated with print settings such as "output paper", "page layout", "bookbinding", "staple", "punch", and the like for the generated electronic document file.

Note that the bookbinding application 104 can register such designations associated with the print settings (designations about functions to be executed by the printer 107) as a template. Upon creation of a new document, the user can select a desired one of templates prepared in advance. That is, the template is information used to designate the functions to be executed by the printing apparatus, connected to the information processing apparatus, upon printing.

Data of the templates are registered in a registry of the document processing system 100 and are managed. The bookbinding application 104 also provides an edit function that allows the user to arbitrary change template data. The registry is a file which saves information such as environment settings of various applications, designations of drivers, and the like. In the Windows® operating system, since the registry file is saved as a binary file, it is impossible to change that file using a versatile text editor or the like. The bookbinding application 104 has a function of reading out this binary file to present it as editable data to the user, and allowing the user to edit template data.

Furthermore, the bookbinding application 104 has a function of saving template information as a file, and an import/export function. With these functions, a template file can be imported to another PC or template data can be exported from another PC.

Figure 12:
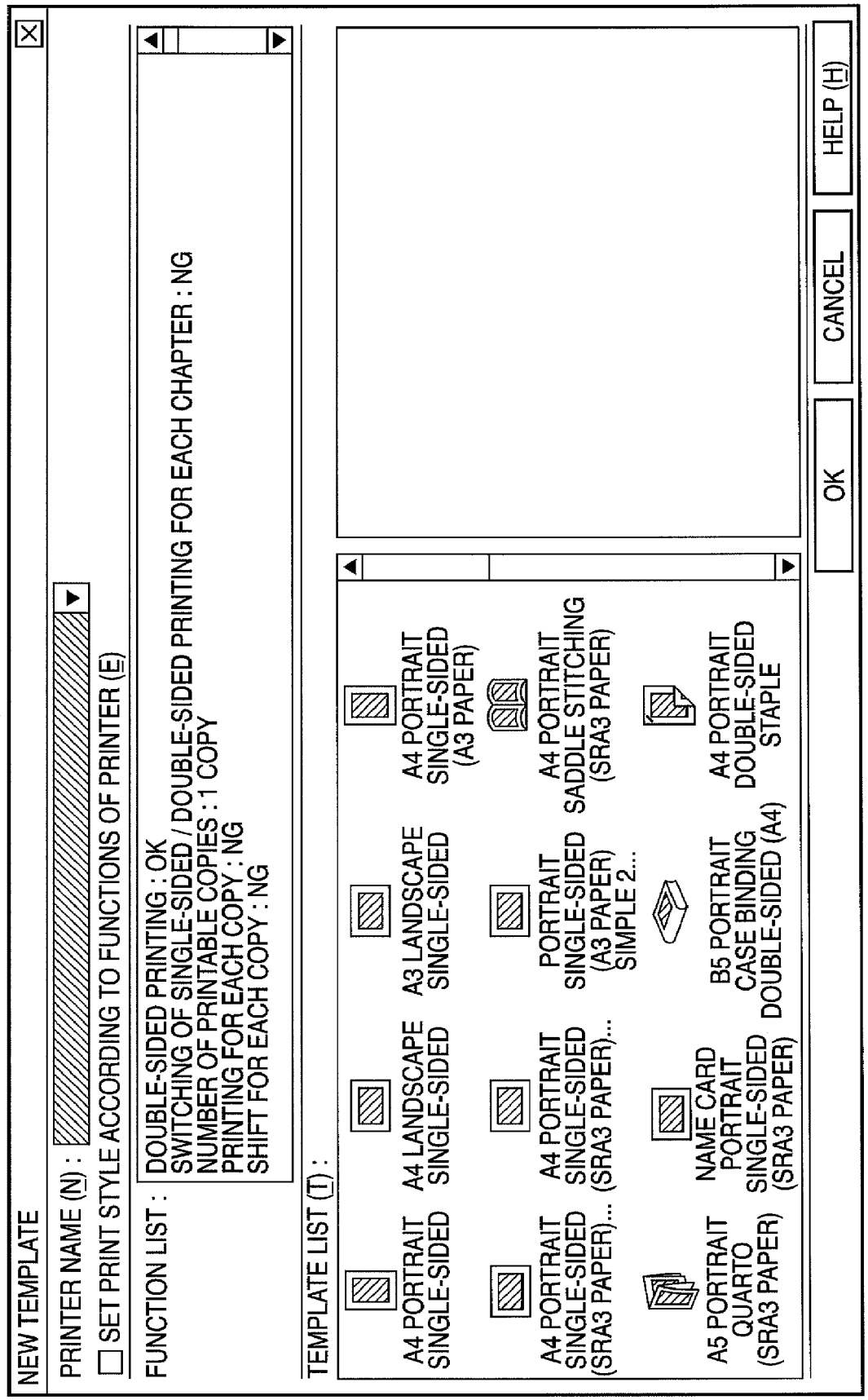
FIG. 12 is a view showing a display example of a window used to select a template displayed by the bookbinding application 104 upon generation of a new document file.

FIG. 12 shows a display example of a window which is displayed by the bookbinding application 104, and is used to select a template. The user can select a desired one of templates prepared by the bookbinding application 104 on this window.

FIG. 13 shows an example when a "template selection" window 1301 is displayed to change the current template during the edit operation of document data by the bookbinding application 104.

The user can change the template on this window. Furthermore, the user can create and register a new template.

<2. Characteristic Configuration of Document Processing System 100>

The document processing system 100 with the aforementioned arrangement and functions according to this embodiment further comprises a characteristic configuration in the edit function of editing a template used in the template selection processing. The characteristic configuration of the template edit function in the document processing system according to this embodiment will be described in detail below.

<2.1 Conventional Template Edit Function>

For the purpose of comparison to the template edit function in the document processing system of this embodiment, a conventional template edit function will be described first.

FIG. 14 shows a display example of a "template setting" window used to edit a template by the bookbinding application 104. As shown in FIG. 14, a list display area 1405 of the "template setting" window 1401 displays a list of templates prepared by the bookbinding application 104. When the user selects a desired template from this area, and clicks an "edit" button 1406, a template edit dialog shown in FIG. 15 is displayed, and the user can freely change the settings of the selected template.

Also, when the user clicks an "add" button 1402, the "template edit" dialog shown in FIG. 15 is displayed. In this case, the settings of the displayed template have default values (1UP, single-sided, no finishing). Hence, the user can create a new template by designating a new template name, and changing individual setting contents. Note that the created template can be registered in the document processing system 100.

Upon selection of an "export" button 1404 on the "template setting" window 1401 in FIG. 14, the template registered in the registry of the document processing system 100 can be saved as a file. Upon selection of an "import" button 1403, a new template file can be registered in the registry of the document processing system 100.

In this manner, with the conventional template edit function, the user creates a template by changing the registered template to the settings of his or her choice. Alternatively, the user creates a new template having default values (e.g., settings like 1UP, single-sided, no finishing) as initial values by designating a new file name, and edits that new template.

In other words, every time the functions of the printing apparatus have changed (added/deleted), the user needs to edit the corresponding template.

<2.2 Template Edit Function of this Embodiment>

<2.2.1 Functional Arrangement about Template Edit Function>

Figure 16:
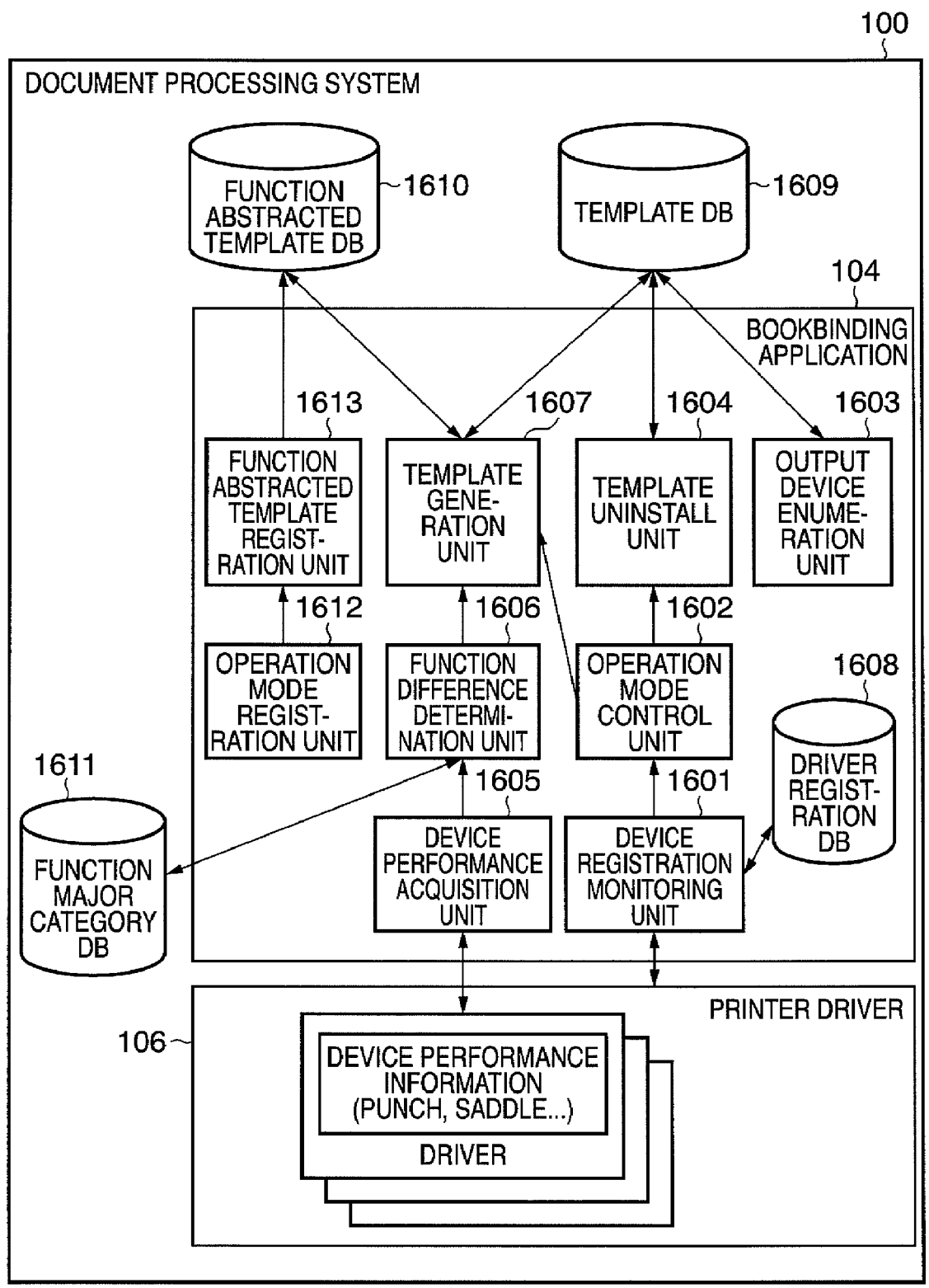
FIG. 16 is a block diagram showing the functional arrangement associated with a template edit function in the document processing system 100.

FIG. 16 is a block diagram showing the functional arrangement associated with the template edit function in the document processing system 100 according to this embodiment. Note that the bookbinding application 104 and printer driver 106 shown in FIG. 16 respectively correspond to those shown in FIG. 1.

Referring to FIG. 16, reference numeral 1601 denotes a device registration monitoring unit which monitors whether or not a printer driver 106 is added to or deleted from the document processing system 100 (the presence/absence of addition or deletion of a printer driver 106).

Reference numeral 1608 denotes a driver registration database (to be abbreviated as DB hereinafter), which stores a driver list that describes printer drivers already registered in the document processing system 100. The device registration monitoring unit 1601 periodically checks information of the printer drivers registered in the document processing system 100 to confirm information associated with addition or deletion of a printer driver. Note that the device registration monitoring unit 1601 may confirm information associated with addition or deletion of a printer driver by monitoring an event issued by the OS at the addition or deletion timing of a printer driver to or from the document processing system 100.

Reference numeral 1602 denotes an operation mode control unit, which determines based on an operation mode (details thereof will be described later) selected by the user which of functions of a template uninstall unit 1604 and template generation unit 1607 is activated.

Reference numeral 1604 denotes a template uninstall unit which deletes, at the deletion timing of a printer driver, information about corresponding printer driver from a corresponding template, or the template itself.

Reference numeral 1609 denotes a template DB in which templates used by the bookbinding application 104 in the document processing system 100 are registered.

Reference numeral 1603 denotes a printing apparatus enumeration unit, which enumerates printer drivers that allow printing using the selected template. Reference numeral 1605 denotes a device performance acquisition unit, which acquires performances (functions) of printing apparatuses using a driver SDK and the like. Reference numeral 1606 denotes a function difference determination unit, which compares the functions of each printing apparatus acquired by the device performance acquisition unit 1605 with those already registered in the document processing system, and determines the presence/absence of a function difference.

Reference numeral 1611 denotes a function major category DB (function major categories will be described later), which categorizes the functions of each printing apparatus to groups having the same categories (example: "two punch holes" and "three punch holes" are categorized to an identical "punch" group), and stores the categorized groups.

Reference numeral 1607 denotes a template generation unit, which automatically generates, when it is determined that the printing apparatus registered in the document processing system 100 has a new function, a template corresponding to that new function based on data in a function abstracted template DB 1610. Note that the function abstracted template DB 1610 will be described later.

Reference numeral 1612 denotes an operation mode registration unit, which registers an operation mode (details thereof will be described later) associated with automatic generation of a template. Reference numeral 1613 denotes a function abstracted template registration unit which registers combinations of abstracted functions.

<2.2.2 UI Associated with Template Edit Function>

Figure 17:
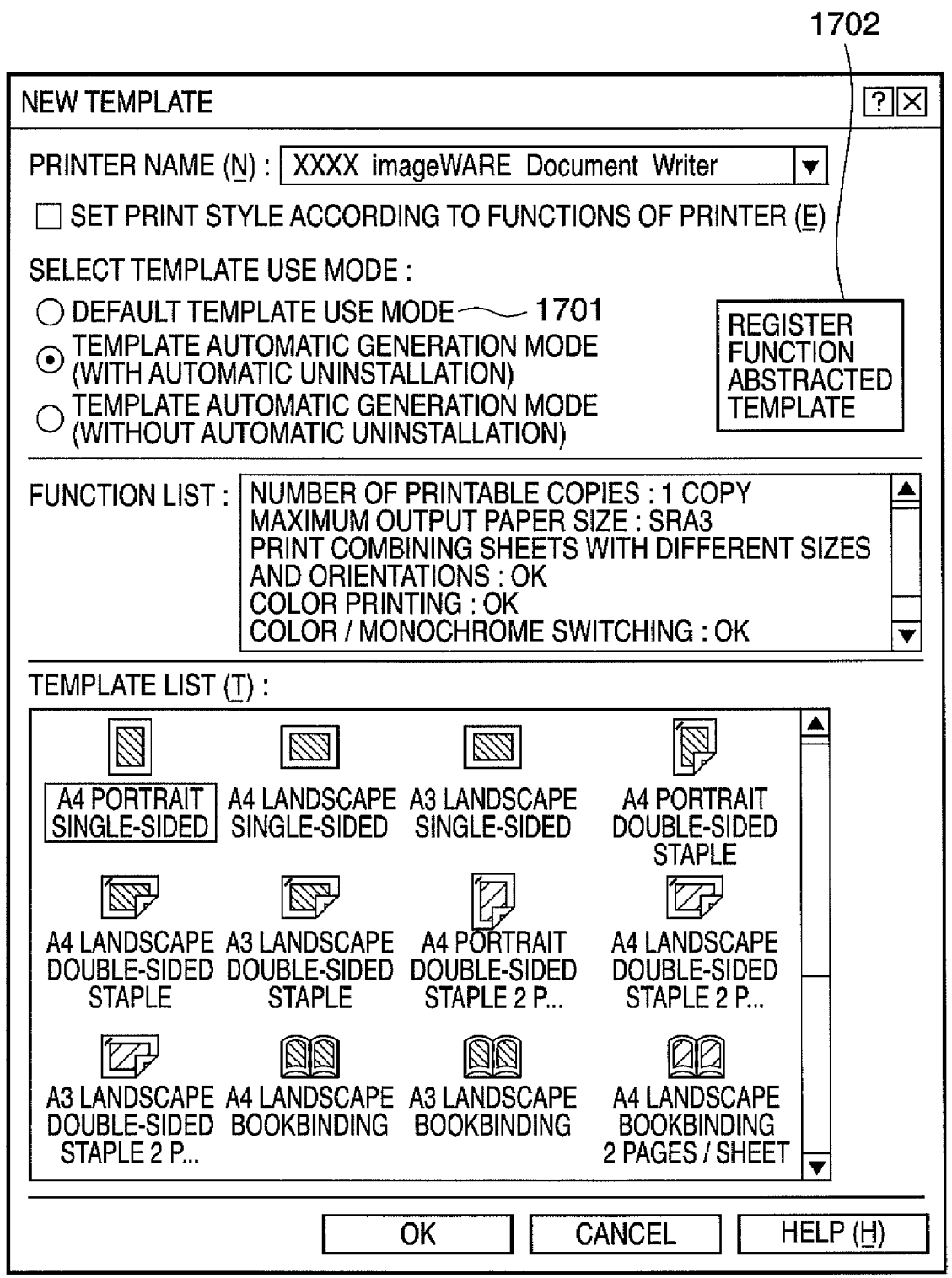
FIG. 17 is a view showing an example of a UI (new template dialog) associated with the template edit function in the bookbinding application 104.

FIG. 17 shows an example of a UI (new template dialog) associated with the template edit function in the bookbinding application 104.

As shown in FIG. 17, the new template dialog includes a "select template use mode" field 1701. The user can select desired one of three operation modes upon using the template edit function. The respective operation modes will be described below.

(1) Default Template Use Mode

In the default template use mode, only existing templates registered in the document processing system 100 are used. In the default template use mode, when a new function is added to a printer driver, the user manually registers a template corresponding to the added function.

(2) Template Automatic Generation Mode (with Automatic Uninstallation)

In the template automatic generation mode, when a printer driver is registered in the document processing system 100, whether or not a new function is added to the printer driver is checked, and if it is determined that the new function is added, a corresponding template is automatically generated. In the template automatic generation mode (with automatic uninstallation), when the registered printer driver is uninstalled from the document processing system 100, the corresponding template is deleted, or information associated with that printer driver is deleted from the template.

(3) Template Automatic Generation Mode (without Automatic Uninstallation)

In this mode, no automatic uninstallation processing is executed, contrary to (2).

In this manner, the default template use mode is a broadly-defined manual mode, and the template automatic generation mode (with automatic uninstallation) and template automatic generation mode (without automatic uninstallation) are broadly-defined automatic modes.

FIG. 18 shows an example of a "register function abstracted template" dialog displayed upon pressing a "register function abstracted template" button 1702 in FIG. 17. Using the "register function abstracted template" dialog, the user can register a new function abstracted template in the function abstracted template DB 1610.

A "function major category item" display area 1801 displays function major categories registered in the function major category DB 1611.

When the user selects an arbitrary function major category item from the "function major category item" display area 1801 and presses an "add" button 1802, the selected function major category item is displayed on a "function abstracted template combination" display area 1804. The function major categories displayed on the "function abstracted template combination" display area 1804 are deleted by pressing a "delete" button 1803.

Upon pressing an "OK" button 1806, the functions displayed on the "function abstracted template combination" display area 1804 are registered in the function abstracted template DB 1610 to have a name input to an "abstracted template name" field 1805.

<2.2.3 Description of Function Major Categories and Function Abstracted Template>

The aforementioned function major categories and function abstracted template will be described in detail below with reference to FIGS. 19, 20, and 21.

FIG. 19 shows the concept of the function major categories. In general, the functions of print processing have many variations such as staple positions, the numbers of holes of punching, folding methods of folding, and the like. These variations of the functions are categorized to abstract groups such as a staple method, punch method, folding method, and the like, and such groups are called function major categories in this specification.

FIG. 20 shows an example of function major categories and shows the correspondence between the function major categories and functions which belong to these categories. In this example, as shown in FIG. 20, the functions of the print processing are categorized to major category groups such as "paper size", "paper type", "imposition", "print processing", "discharge processing", "folding", and the like, and "paper size" and "paper brand" use settings which are registered in advance by the user. Also, as shown in FIG. 20, "print method" as a function major category item includes functions such as "single-sided printing", "double-sided printing", and "saddle stitching".

FIG. 21 shows an example of a function abstracted template. In this specification, a template formed by combining the function major categories will be referred to as a function abstracted template. The registration method of a function abstracted template has been described using FIG. 18.

<2.3 Sequence of Template Edit Processing in this Embodiment>

The sequence of the template edit processing in the document processing system 100 according to this embodiment will be described below.

<2.3.1 Sequence of Pre-processing>

The sequence of pre-processing required to execute the template edit processing of this embodiment will be described first.

Figure 22:
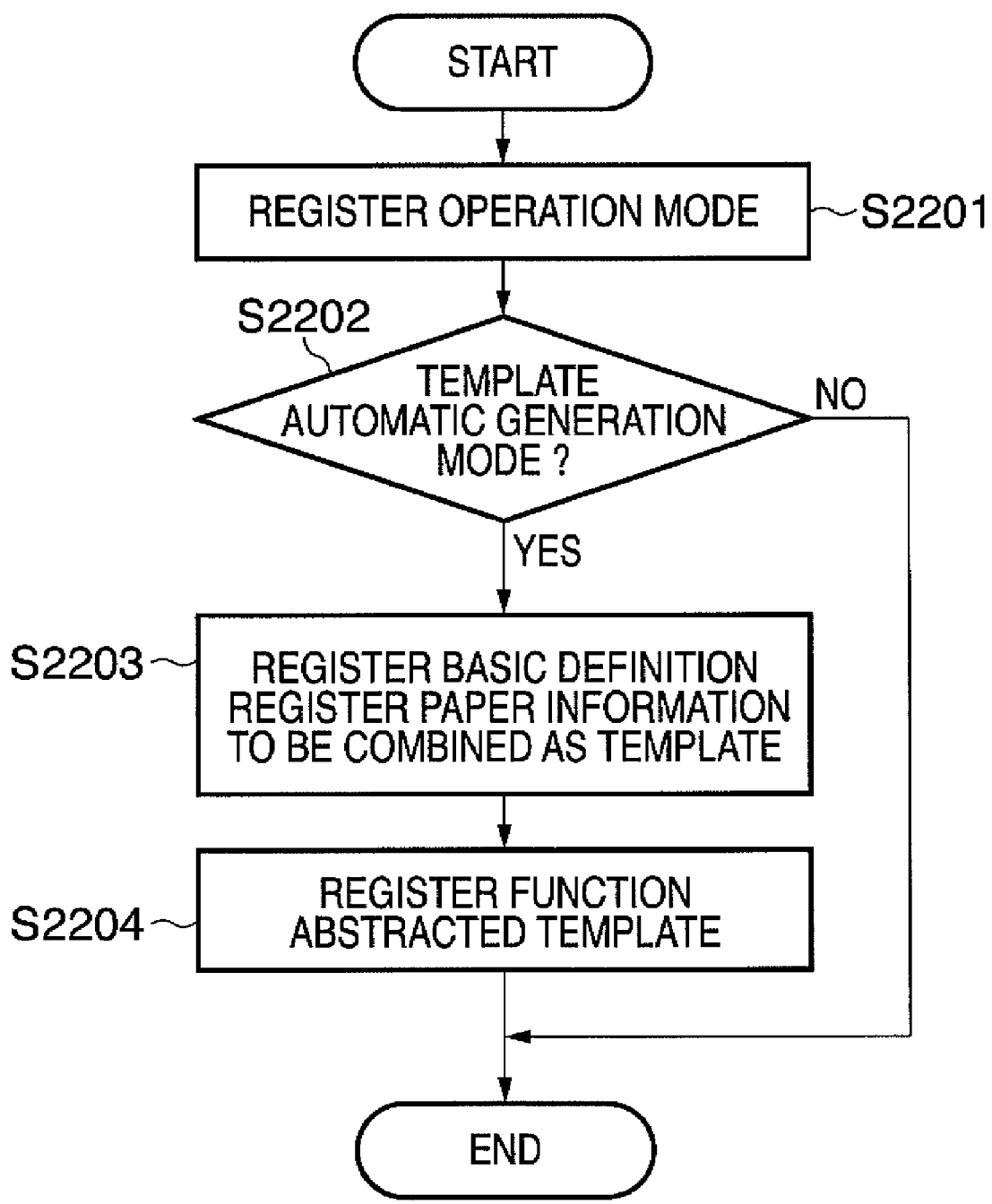
FIG. 22 is a flowchart showing the sequence of operation mode registration processing and function abstracted template registration processing required as pre-processing of template automatic generation.

FIG. 22 is a flowchart showing the sequence of the operation mode registration processing and function abstracted template registration processing required as pre-processing of template automatic generation processing executed by the bookbinding application 104.

In step S2201, the bookbinding application 104 accepts registration of the operation mode of the template automatic generation processing. More specifically, the bookbinding application 104 accepts the operation mode which is input by the user via the "select template use mode" field 1701 in FIG. 17.

The bookbinding application 104 checks in step S2202 if the operation mode accepted in step S2201 is the template automatic generation mode. If it is determined that the template automatic generation mode is selected, the process advances to step S2203.

In step S2203, since each of "paper size", "paper brand", and the like includes a plurality of options, the bookbinding application 104 registers in advance options to be combined upon automatic generation. For example, when A4 and A3 paper sheets are to be combined upon automatic generation of a template, these paper sizes are registered in advance.

In step S2204, the bookbinding application 104 registers a function abstracted template. More specifically, the function major category items displayed on the "function abstracted template combination" display area 1804 upon pressing the "OK" button 1806 on the "register function abstracted template" dialog (FIG. 18) are registered in the function abstracted template DB 1610.

<2.3.2 Sequence of Template Edit Processing>

Figure 23:
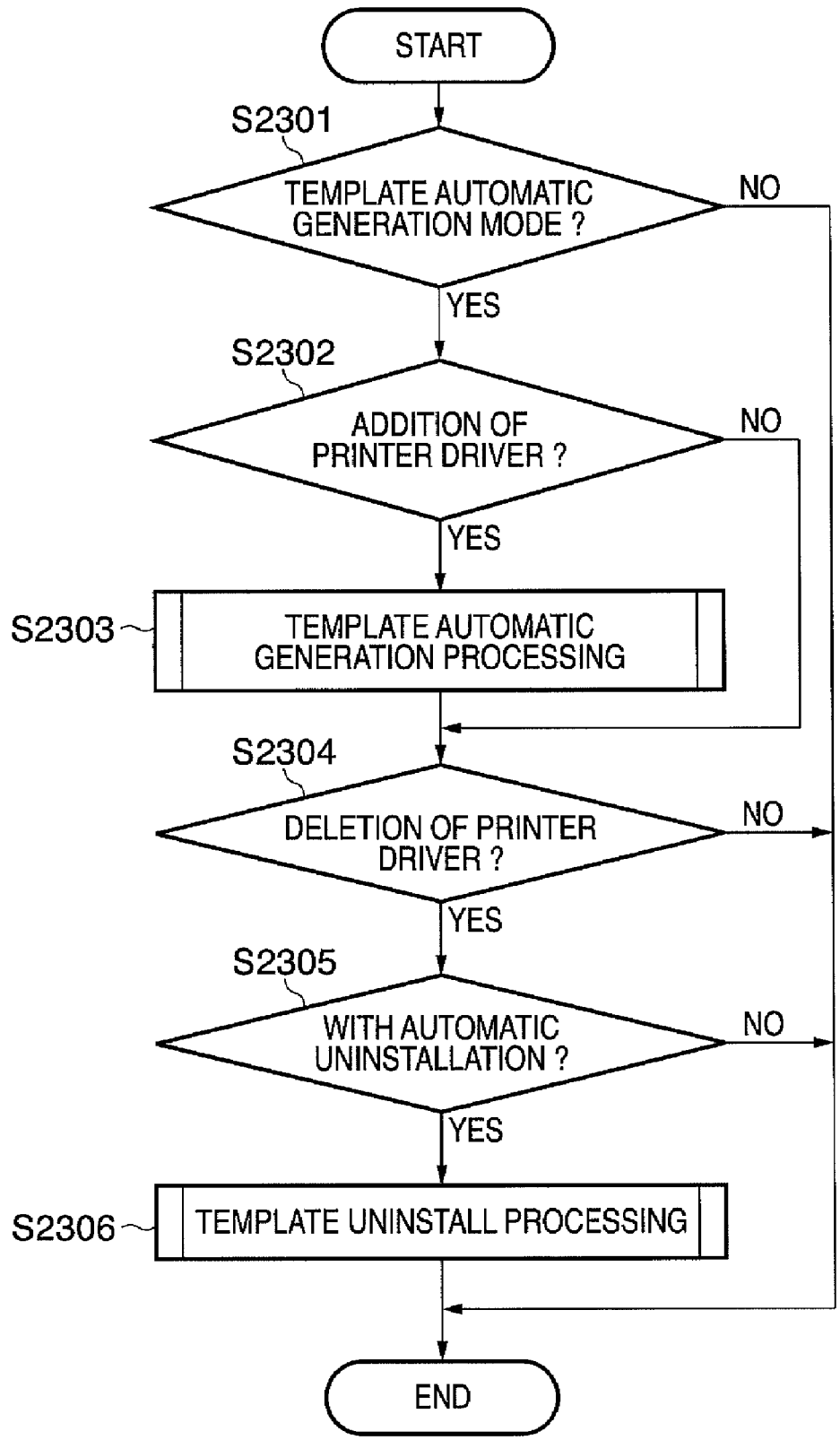
FIG. 23 is a flowchart showing the sequence of template edit processing in the bookbinding application 104.

FIG. 23 is a flowchart showing the sequence of the template edit processing of the bookbinding application 104.

If the device registration monitoring unit 1601 detects addition or deletion of a printer driver, the process advances to step S2301.

In step S2301, the operation mode control unit 1602 confirms the operation mode to check if the template automatic generation mode is set. If it is determined that the template automatic generation mode is set, the process advances to step S2302.

The device registration monitoring unit 1601 checks in step S2302 if a printer driver is added. If it is determined in step S2302 that a printer driver is added, the template generation unit 1607 executes template automatic generation processing in step S2303, and the process then advances to step S2304. On the other hand, if it is determined that a printer driver is not added, the process jumps to step S2304. Note that details of the template automatic generation processing (step S2303) will be described later. Note that addition of a printer driver is monitored in step S2302. However, the present invention is not limited to a printer driver. For example, the device registration monitoring unit 1601 may monitor whether or not a new printing apparatus is connected. In this case, if a new printing apparatus is connected, the process advances to step S2303.

The device registration monitoring unit 1601 checks in step S2304 if a printer driver is deleted. If it is determined in step S2304 that a printer driver is deleted, the process advances to step S2305. The template uninstall unit 1604 checks in step S2305 if "automatic uninstallation=ON" is set. If it is determined in step S2305 that "automatic uninstallation=ON" is set, the template uninstall unit 1604 executes template uninstall processing in step S2306, and the processing ends. On the other hand, if it is determined that a printer driver is not deleted or if it is determined that "automatic uninstallation=OFF" is set, the processing ends. Note that details of the template uninstall processing (step S2306) will be described later.

<2.3.3 Sequence of Template Automatic Generation Processing (Step S2303)>

Figure 24:
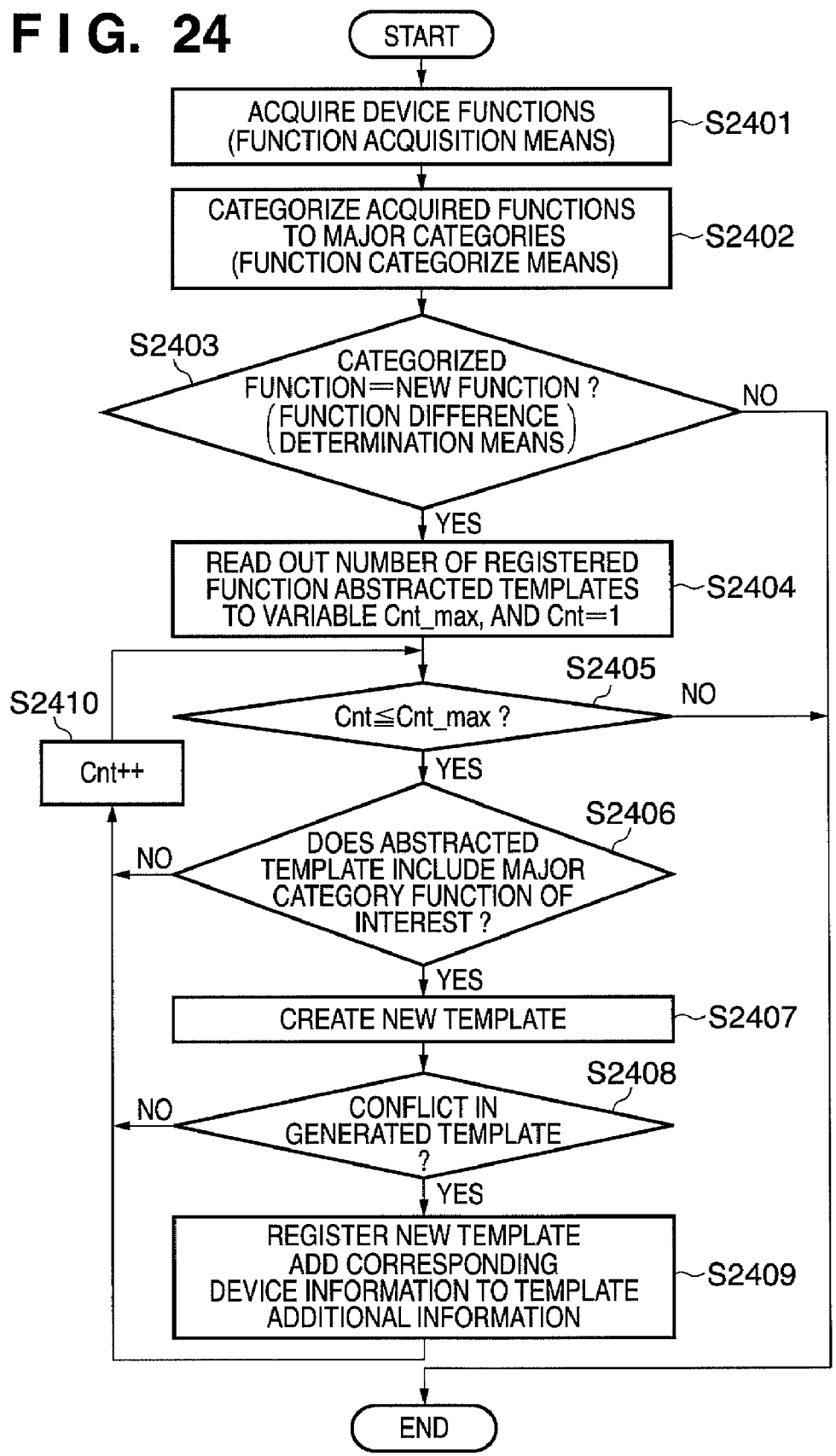
FIG. 24 is a flowchart showing details of template automatic generation processing (step S2303)

FIG. 24 is a flowchart showing details of the template automatic generation processing (step S2303). The template automatic generation processing is executed by the template generation unit 1607, function difference determination unit 1606, and device performance acquisition unit 1605 of the bookbinding application 104.

In step S2401, the device performance acquisition unit 1605 acquires the performance of a printing apparatus using a driver SDK. Note that the following description of the flowchart will be given under the assumption that the following device performance is acquired as a practical example.

<Performance Example of Printing Apparatus Acquired in Step S2401>

In this embodiment, function information acquired from a printing apparatus corresponding to a driver upon addition of that driver includes "V-folding", "C-folding", "single-sided printing", "double-sided printing", "saddle stitching", "1-position stapling", "2-position stapling", "binder 2 holes", "binder 4 holes", and "multi-hole punching".

In steps S2302 and S2403, the function difference determination unit 1606 determines function differences by checking to which function major categories the functions acquired in step S2401 belong.

More specifically, in step S2402 the function difference determination unit 1606 executes function major categorization for categorizing the functions acquired in step S2401 to groups, that is, respective function major category items.

As a method of implementing function major categorization, for example, a method of acquiring information of category attributes from the SDK (a method of simultaneously acquiring information indicating a function major category item of "V-folding" upon acquiring the performance "V-folding") may be used. Alternatively, a method of registering in advance function categorization rules in the document processing system 100, and categorizing functions according to these rules (a method of defining correspondence between "V-folding" and a corresponding function major category item as a categorization rule in advance, and implementing function major categorization with reference to that rule upon categorization) may be used.

Note that an example of the categorization result upon categorizing the functions acquired in step S2401 to function major categories is as follows.

<Example of Function Major Categories>
Folding (V-folding, C-folding)
Print method (single-sided/double-sided/saddle stitching)
Stapling method (1-position stapling, 2-position stapling)
Punching method (binder 2 holes, binder 4 holes, multi-hole punching)

In step S2403, the function difference determination unit 1606 checks function differences. More specifically, the function difference determination unit 1606 checks if each function categorized to a given function major category is the already registered function. Upon checking, the function difference determination unit 1606 uses list information (existing registered functions) of function major categories, which is generated based on the functions acquired from a plurality of printer drivers already registered in the document processing system 100 and is stored in the document processing system 100. Then, the function difference determination unit 1606 compares the list information of the function major categories with that generated in step S2402. If difference functions (new functions for the document processing system 100; new functions that the printing apparatus can execute) are detected, the process advances to step S2404. That is, the bookbinding application 104 specifies the difference functions of the printing apparatus, which can be selected by the information processing apparatus, as functions to be registered.

Note that an example of practical determination results determined as difference functions will be described below.

When the existing registered functions are as described in the following example, if they are compared with the functions categorized into the function major categories in step S2402, "C-folding" in the function major category "folding" is a difference function. Also, "multi-hole punching" in the function major category "punching method" is a difference function. On the other hand, no difference function is detected from "print method" and "stapling method".

<Example of Existing Registered Functions>
Folding (V-folding, Z-folding)→difference function "C-folding"
Print method (single-sided/double-sided/saddle stitching)
Stapling method (1-position stapling, 2-position stapling)
Punching method (binder 2 holes, binder 4 holes)→difference function "multi-hole punching"

The processes in step S2404 and subsequent steps are executed by the template generation unit 1607.

In step S2404, the template generation unit 1607 counts the number of registered function abstracted templates. More specifically, the template generation unit 1607 counts the number of function abstracted templates registered in the function abstracted template DB 1610, substitutes the count value in Cnt_max, and sets "1" in a counter Cnt.

In step S2405, the template generation unit 1607 compares the number of registered function abstracted templates with the count value. If the count value Cnt exceeds Cnt_max, the processing ends. On the other hand, if the count value Cnt is equal to or smaller than Cnt_max, the process advances to step S2406.

In step S2406, the template generation unit 1607 reads out a function abstracted template, and checks if the readout function abstracted template includes a function major category item corresponding to the difference function determined in step S2403.

A practical explanation will be given using the above example. If the readout function abstracted template includes "print method" and "stapling method" as function major categories, the template generation unit 1607 determines that the readout template does not include a function major category item corresponding to the difference function. On the other hand, if the readout function abstracted template includes "paper size", "print method", and "folding", the template generation unit 1607 determines that the readout template includes a function major category item corresponding to the difference function. If it is determined that the readout template includes the function major category item, the process advances to step S2407; otherwise, the process advances to step S2410.

In step S2407, the template generation unit 1607 creates a new template. More specifically, the template generation unit 1607 automatically generates a template for a combination of function major category items which configure the readout function abstracted template and to which a function is added. Note that the following description will be given under the assumption that a combination of "paper size", "print method", and "folding" is selected for the function major category items which configure the function abstracted template.

In this case, a template is automatically generated to have a combination including
paper size: paper size registered in advance by the user (example: A4, A3)
print method: single-sided/double-sided/saddle stitching
folding: C-folding
Combinations of templates to be automatically generated in practice are as follows:
template (1): A4, single-sided, C-folding
template (2): A4, double-sided, C-folding
template (3): A4, saddle stitching, C-folding
template (4): A3, single-sided, C-folding
template (5): A3, double-sided, C-folding
template (6): A3, saddle stitching, C-folding The template generation unit 1607 checks in step S2408 if respective templates generated in step S2407 are usable by the printer driver 106 (such checking will be referred to as conflict checking hereinafter). As a conflict checking method, for example, a method of setting the setting of a template in the printer driver 106 using the SDK, and executing conflict checking is known as a state-of-the-art technique.

As a determination method in conflict checking, for example, a method of determining no conflict if the setting of a template is valid for at least one printer driver registered in the document processing system 100 may be used. Alternatively, a method of determining no conflict if the setting of a template can be commonly applied to all printer drivers may be used. In this case, both the determination methods are effective, but a description of this embodiment will be given using the former determination method.

A conflict checking result for each template is managed as template management information (to be referred to as template information hereinafter) in association with the template setting and a printer driver that can use the template.

FIG. 25 shows an example of template information. No conflict is determined for templates (1) and (2) since usable printer drivers are found, but a conflict is determined for template (3) since no usable printer driver is found.

If a conflict is determined for all the templates generated in step S2407 (if no usable printer driver is found), the template registration is aborted, and the process advances to step S2410; otherwise, the process advances to step S2409.

In step S2409, the template generation unit 1607 registers the template information in the document processing system 100 based on the conflict determination results in step S2408 (see FIG. 25). That is, the bookbinding application 104 registers the template information determined to have no conflict in the document processing system 100.

If the template DB 1609 stores the registered template information and its processing is completed, the process advances to step S2410 to increment the value of the counter Cnt by 1.

The aforementioned processes are repeated until Cnt>Cnt_max, thus completing the template automatic generation processing.

<2.3.4 Sequence of Template Uninstall Processing (Step S2306)>

Figure 26:
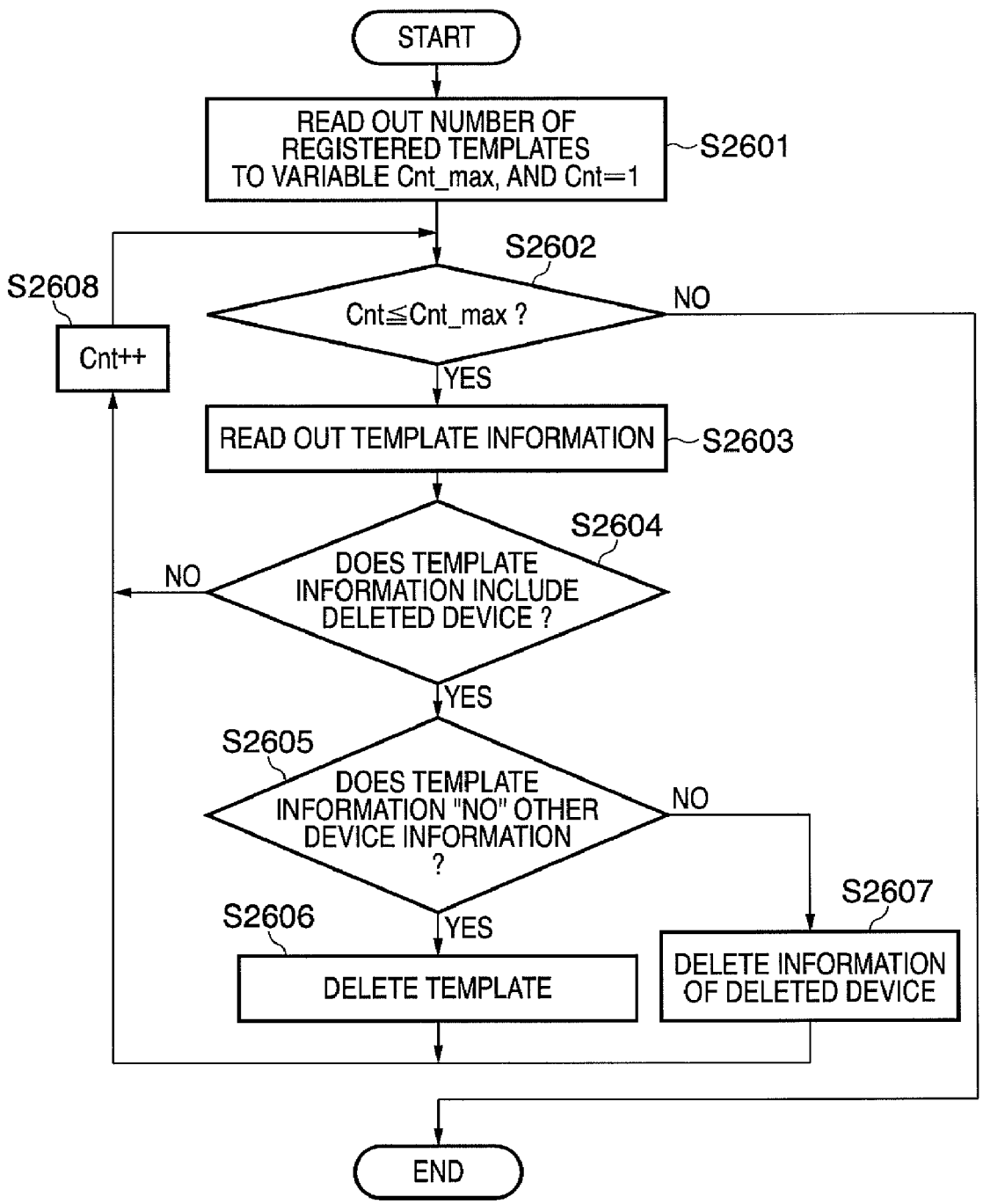
FIG. 26 is a flowchart showing details of template uninstall processing (step S2305)

FIG. 26 is a flowchart showing details of the template uninstall processing (step S2306). The template uninstall processing is executed by the template uninstall unit 1604 of the bookbinding application 104.

In step S2601, the template uninstall unit 1604 counts the number of pieces of registered template information. More specifically, the template uninstall unit 1604 counts the number of pieces of template information registered in the template DB 1609 (the number of registered entries), saves the count value in Cnt_max, and then sets "1" in a counter Cnt.

In step S2602, the template uninstall unit 1604 compares the counted number of registered entries with the counter value. If it is determined in step S2602 that the count value Cnt exceeds the number Cnt_max of registered entries, the processing ends. On the other hand, if the count value Cnt is equal to or smaller than the number Cnt_max of registered entries, the process advances to step S2603.

In step S2603, the template uninstall unit 1604 reads out template information from the template DB 1609.

The template uninstall unit 1604 checks in step S2604 if the usable printer driver or drivers stored in the template information read out in step S2603 include the deleted printer driver. Note that deletion of the printer driver is detected by the device registration monitoring unit 1601.

If it is determined in step S2604 that the deleted printer driver is included, the process advances to step S2605; otherwise, the process advances to step S2608.

The template uninstall unit 1604 checks in step S2605 if a plurality of printer drivers are registered as the usable printer drivers stored in the template information. If only one printer driver is registered, the process advances to step S2606 to delete the template information of interest. On the other hand, if it is determined that a plurality of printer drivers are registered, the process advances to step S2607.

In step S2607, the template uninstall unit 1604 deletes information of the deleted printer driver from the usable printer drivers in the template information. After the aforementioned processes, the process advances to step S2608 to increment the value of the counter Cnt by 1.

The aforementioned processes are repeated until Cnt>Cnt_max, thus completing the template uninstall processing.

A template displayed using this embodiment will be described below.

FIG. 33 shows templates already registered in the bookbinding application 104. As shown in FIG. 33, the current bookbinding application 104 manages nine templates.

As a result of execution of the processing of this embodiment, since a new template is registered, a new template 3401 is added in FIG. 34, and a slide bar 3402 is also displayed. FIG. 34 illustrates that templates are registered after the template 3401.

As can be seen from the above description, in the document processing system according to this embodiment, when the functions of a printing apparatus have changed, a usable template is automatically generated. As a result, the need for a template edit operation which was required conventionally can be obviated, thus greatly improving the user's operability. On the other hand, since a template which can no longer be used due to deletion of a printer driver or the like is automatically deleted, the user can be prevented from inadvertently selecting an unusable template.

When the bookbinding application can select one of a plurality of printing apparatuses, it manages the function information of the plurality of printing apparatuses, and checks using the function information of the plurality of printing apparatuses if a template is to be generated. Such checking processing is one of characteristic functions of the application. Since the application comprises that function, the problems of the present application can be solved.

[Second Embodiment]

The first embodiment has explained the processing when a new printer driver is added to a document processing system. By contrast, this embodiment will explain processing when a template is imported to the document processing system.

As an import example, for example, certain user A may transmit a template generated by the self bookbinding application to a bookbinding application of user B. In this case, the bookbinding application of user B imports that template. However, upon reception of a template using an import function, the imported template is not always used in the system of interest (e.g., user B). For this reason, user B needs to confirm if the received template can be used. The second embodiment has as its object to solve such problem upon importing. The second embodiment of the present invention will be described in detail hereinafter with reference to the accompanying drawings. Note that in the second embodiment, differences from the first embodiment will be explained.

Figure 27:
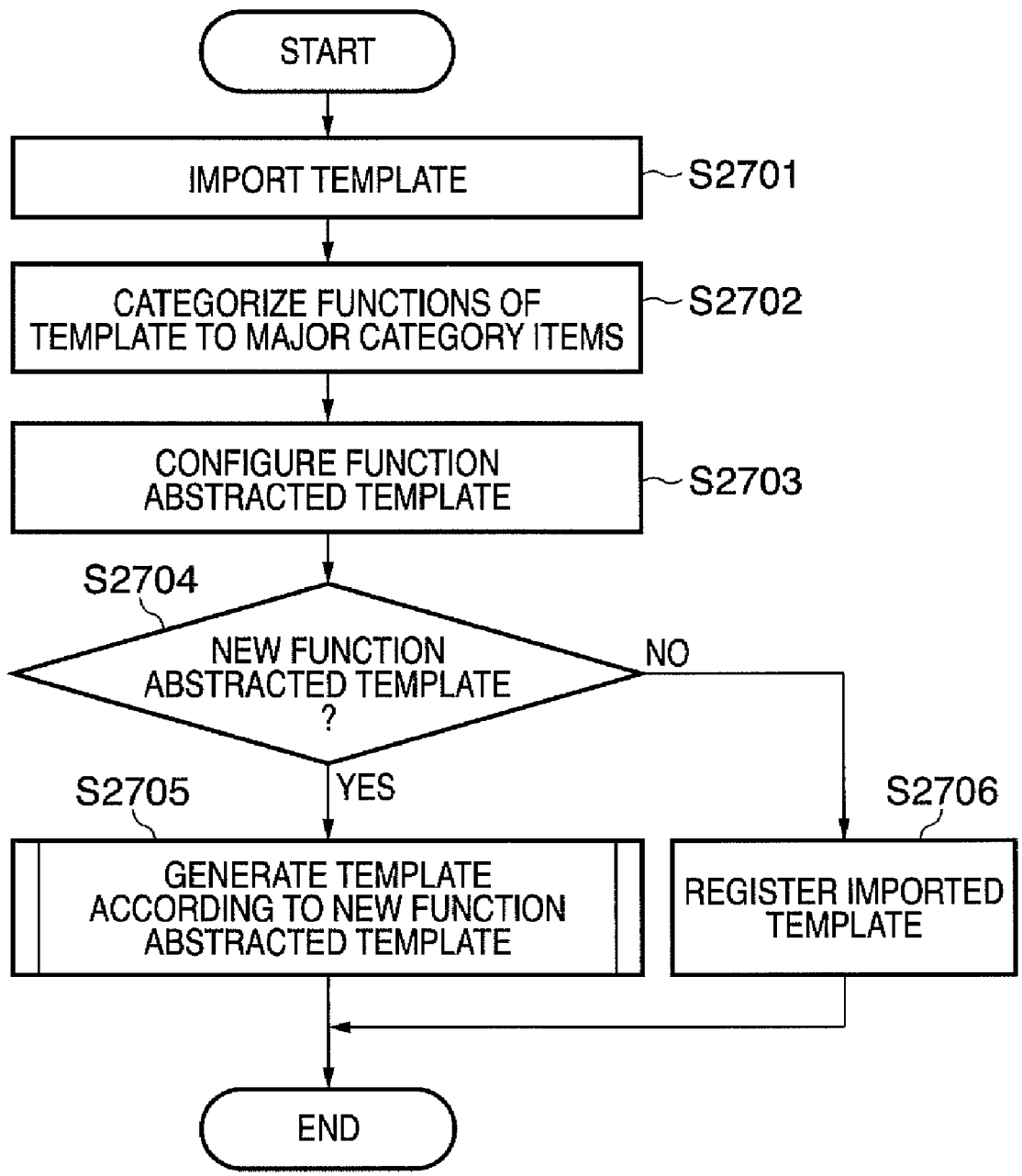
FIG. 27 is a flowchart showing the sequence from when a template is imported until a template is automatically generated.

FIG. 27 is a flowchart showing the sequence of processing from when a template is imported until a template is automatically generated.

In step S2701, a bookbinding application 104 accepts import of a template. In step S2702, the bookbinding application 104 categorizes functions which configure the template with reference to a function major category DB 1611.

In step S2703, the bookbinding application 104 generates a function abstracted template based on the functions categorized in step S2702.

Note that the processing for generating a function abstracted template in step S2703 will be described below taking a practical example.

In this case, the following explanation will be given using function major category data (1) as a data example defined in the function major category DB 1611, and import template (2) as a data example of the imported template.

(1) Example of Function Major Category Data
folding (V-folding, C-folding)
print method (single-sided/double-sided/saddle stitching)
stapling method (1-position stapling, 2-position stapling)
punching method (binder 2 holes, multi-hole punching)

(2) Example of Import Template
single-sided+multi-hole+V-folding

In this case, by determining matches between the functions of the import template and the function major category items of the function major category data, function abstracted template (3) below is obtained. That is, by applying "single-sided in the example of import template (2) to the example of function major category data (1), the abstracted result of "single-sided" is "print method". Likewise, the abstracted result of "multi-hole" is "punching method", and the abstracted result of "V-folding" is "folding". Hence, the abstracted results of the example of import template (2) are:

(3) Function Abstracted Template
folding+print method+punching method

The bookbinding application 104 checks in step S2704 if the function abstracted template extracted in step S2703 is a new template. More specifically, the bookbinding application 104 searches the function abstracted template DB 1610 for a template having the same combination.

If a template having the same combination is found (NO in step S2704), the process advances to step S2706, and the bookbinding application 104 applies conflict checking to the imported template. If no conflict occurs, the bookbinding application 104 registers that template in the template DB 1609 together with template information. That is, in the above example, the bookbinding application 104 applies conflict checking to the received template "single-sided+multi-hole+V-folding", and then registers it in the template DB 1609.

If a new function abstracted template is determined, the process advances to step S2705, and the bookbinding application 104 executes template automatic generation processing.

FIG. 28 is a flowchart showing details of the template automatic generation processing in step S2705.

In step S2801, the bookbinding application 104 reads out function major category items included in the function abstracted template extracted in step S2703.

A description will be given using the aforementioned practical example. The function major category items read out in step S2801 are as follows.

<Function Major Category Items>
folding
print method
punching method

In step S2802, the bookbinding application 104 creates a new template by combining the functions registered in the respective function major category items. A description will be given using the aforementioned practical example. The abstracted template based on the imported template is "folding+print method+punching method". Hence, in order to generate templates of "folding+print method+punching method", the bookbinding application 104 reads out the functions registered in the respective function major category items.

In this case, the functions which are registered in the respective function major category items and are read out in step S2801 are as follows:
folding: V-folding, C-folding
print method: single-sided/double-sided/saddle stitching
punching method: binder 2 holes, multi-hole punching Therefore, by combining these functions, templates are automatically generated. Combinations of templates to be generated in practice are as follows.
V-folding, single-sided, binder 2 holes
V-folding, single-sided, multi-hole punching
V-folding, double-sided, binder 2 holes
V-folding, double-sided, multi-hole punching
V-folding, saddle stitching, binder 2 holes
V-folding, saddle stitching, multi-hole punching
C-folding, single-sided, binder 2 holes
C-folding, single-sided, multi-hole punching
C-folding, double-sided, binder 2 holes
C-folding, double-sided, multi-hole punching
C-folding, saddle stitching, binder 2 holes
C-folding, saddle stitching, multi-hole punching The bookbinding application 104 checks in step S2803 if the respective templates generated in step S2802 are usable in printing apparatuses (conflict checking). This process is the same as that in step S2408 described in the first embodiment.

If a conflict is determined for all the templates generated in step S2802 (if no usable printer driver is found), the processing ends; otherwise, the process advances to step S2804.

In step S2804, the bookbinding application 104 registers template information determined in step S2803 to cause no conflict in the document processing system 100. More specifically, the bookbinding application 104 stores the template information in the template DB 1609.

As can be apparent from the above description, according to this embodiment, upon importing a new template, templates of an abstracted template based on the imported template can be automatically generated.

[Third Embodiment]

In the first and second embodiments, when a printer driver is added or deleted, or when a template is imported, templates are automatically generated. However, all of automatically generated templates are not always suited to use of the user, and templates which are not used may be automatically generated.

To solve this problem, it is effective to add a registration confirmation mode of confirming whether or not to register a template upon registering templates. This embodiment will explain a case in which the registration confirmation mode is added to the document processing system 100 according to the first embodiment. Note that addition of the registration confirmation mode can be implemented by adding the registration confirmation mode to step S2201 in FIG. 22 described in the first embodiment, and replacing the processing of step S2409 in FIG. 24 by that shown in FIG. 32. Differences from the first embodiment will be mainly explained below.

FIG. 29 shows an example of a UI window by adding a template registration confirmation mode as an operation mode to the new template dialog (FIG. 17). When the user sets a "confirm registration of automatically generated template" check box 2901 to ON, the registration confirmation mode is set ON.

Figure 30:
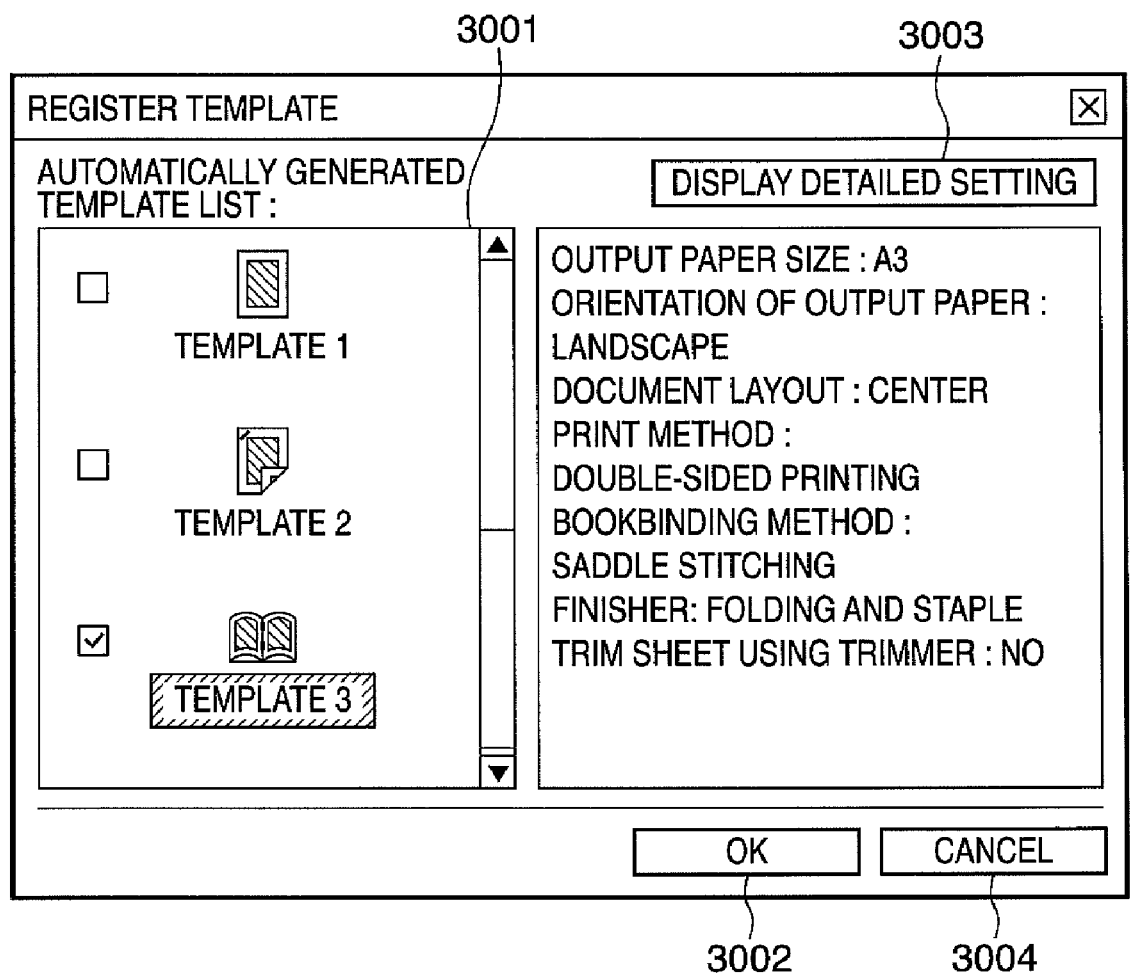

FIGS. 30 and 31 show examples of UIs when the registration confirmation mode is ON in the document processing system according to this embodiment.

FIG. 30 shows an example of a dialog for confirming registration of templates. An "automatically generated template list" 3001 in the dialog displays a list of templates which are determined to cause no conflict in step S2408.

The user sets a check box corresponding each template displayed on the "automatically generated template list" 3001 for the templates that he or she wants to register (to instruct to permit registration), and then presses an "OK" button 3002. When the user presses a "display detailed setting" button 3003 while the "automatically generated template list" 3001 is highlighted, a "template detailed setting" dialog in FIG. 31 is displayed. The user can change detailed settings on that dialog.

FIG. 32 is a flowchart showing the sequence of new template registration processing upon making confirmation of registration of each template.

In step S3201, a bookbinding application 104 checks the status of the template registration confirmation mode. If it is determined that the registration confirmation mode is ON, the process advances to step S3202.

In step S3202, the bookbinding application 104 generates a list of automatically generated templates which are determined to cause no conflict, and displays that list as a UI window. More specifically, the bookbinding application 104 opens the "register template" dialog (FIG. 30). The "automatically generated template list" 3001 on this dialog is a display example of the generated list.

The bookbinding application 104 checks in step S3203 if the user presses "OK" button 3002 or a "cancel" button 3004 on the "register template" dialog (FIG. 30). If it is determined that the user presses the "OK" button 3002, the process advances to step S3204; if it is determined that the user presses the "cancel" button 3004, the process jumps to step S3207.

The bookbinding application 104 checks in step S3204 if the user selects a template in the "automatically generated template list" 3001, and presses the "display detailed setting" button 3003. If it is determined that the user presses the "display detailed setting" button 3003, the process advances to step S3205.

In step S3205, the bookbinding application 104 displays the detailed setting UI window. More specifically, the bookbinding application 104 displays the detailed setting information of the template selected in step S3204. In this way, the user can change the settings. Note that the "template detailed setting" dialog in FIG. 31 is a display example of the UI window to be displayed in this step.

In step S3206, the bookbinding application 104 executes processing when the user presses an "OK" button 3101 on the "template detailed setting" dialog. If the user presses the "OK" button 3101, the bookbinding application 104 overwrites the settings of the template of interest by those in the "template detailed setting" dialog; if he or she presses a "cancel" button 3104, the bookbinding application 104 does not change the template.

The bookbinding application 104 checks in step S3207 if the user sets the check boxes of templates to be registered to ON and then presses the "OK" button 3002 on the "register template" dialog. If it is determined that the user selects the templates to be registered, the process advances to step S3208 accordingly.

In step S3208, the bookbinding application 104 registers the template selected in step S3207 in a template DB 1609 of the document processing system 100.

In step S3209, the bookbinding application 104 registers only templates which are determined to cause no conflict in step S2408 in the document processing system 100 as in step S2409.

As can be seen from the above description, in the document processing system according to this embodiment, automatically generated templates are registered after user's registration confirmation. As a result, registration of templates which are not required for the user can be avoided.

In the present application, the aforementioned processing has been explained as a technique to be executed by the bookbinding application 104, but may be executed by a printer driver.

[Other Embodiments]

Note that the present invention may be applied to either a system constituted by a plurality of devices (e.g., a host computer, interface device, reader, printer, and the like), or an apparatus consisting of a single device (e.g., a copying machine, facsimile apparatus, or the like).

The objects of the present invention are also achieved by supplying a storage medium, which records a program code of software that implements the functions of the aforementioned embodiments to the system or apparatus. In this case, the functions are implemented when a computer (or a CPU or MPU) of the system or apparatus reads out and executes the program code stored in the storage medium. Note that the storage medium that stores the program code constitutes the present invention in such case.

As the storage medium for supplying the program code, for example, a Floppy® disk, hard disk, optical disk, magneto-optical disk, CD-ROM, CD-R, magnetic tape, nonvolatile memory card, ROM, and the like may be used.

The present invention is not limited to the case in which the functions of the aforementioned embodiments are implemented when the computer executes the readout program code. For example, the present invention also includes a case wherein an OS (operating system) running on a computer may execute some or all of actual processes based on an instruction of the program code to implement the functions of the aforementioned embodiments.

Furthermore, the present invention also includes a case wherein the functions of the aforementioned embodiments are implemented after the program code read out from the storage medium is written in a function expansion board or unit, which is inserted into or connected to the computer. That is, the present invention includes a case wherein after the program code is written in a memory, a CPU or the like equipped on the function expansion board or unit executes some or all of actual processes to implement the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-132032 filed on May 17, 2007 and 2008-074382 filed on Mar. 21, 2008, which are hereby incorporated by reference herein in their entirety.

What is claimed is:

1. An information processing apparatus capable of connecting to a printing apparatus and editing a template that designates functions to be executed by the printing apparatus upon printing, comprising:

a specifying unit configured to specify functions to be registered based on functions of the printing apparatus which can be selected by said information processing apparatus;

a generation unit configured to generate a template that designates execution of print processing using at least the functions specified by said specifying unit;

a determining unit configured to determine whether or not the template generated by said generation unit is usable in at least one driver of said information processing apparatus; and a registration unit configured to, when said determining unit determines that the template is usable in at least one driver, register the template, wherein the template includes a plurality of parameters to designate functions to be executed by the printing apparatus.

2. The apparatus according to claim 1, further comprising:

a setting unit configured to set one of an automatic mode and a manual mode; and a determination unit configured to determine the presence/absence of addition of a driver required to operate the printing apparatus, wherein when said determination unit determines that the driver is added, and when said setting unit sets the automatic mode, said specifying unit specifies the functions to be registered.

3. The apparatus according to claim 1, further comprising:

a storage unit configured to store information associated with functions of the printing apparatus while categorizing the functions into a plurality of groups; and a selection unit configured to select groups included in the template from the plurality of groups, wherein said generation unit generates the template by combining the function specified by said specifying unit and functions which belong to the groups selected by said selection unit.

4. The apparatus according to claim 3, wherein said specifying unit specifies with newly executable functions by comparing the functions stored in said storage unit, and functions of a printing apparatus corresponding to the added driver.

5. The apparatus according to claim 2, wherein said determination unit determines the presence/absence of deletion of a driver required to operate the printing apparatus, and when said determination unit determines that the driver is deleted, said generation unit deletes a template in which the deleted driver is registered as a usable driver.

6. The apparatus according to claim 2, wherein said determination unit further determines the presence/absence of input of a new template, and when said determination unit determines that the new template is input, said specifying unit specifies a function which is not designated in already registered templates and is designated in the input new template.

7. An information processing method in an information processing apparatus capable of connecting to a printing apparatus and editing a template that designates functions to be executed by the printing apparatus upon printing, comprising:

specifying functions to be registered based on functions of the printing apparatus which can be selected by the information processing apparatus;

generating a template that designates execution of print processing using at least the specified functions;

determining whether or not the generated template is usable in at least one driver of said information processing apparatus; and registering the template when it is determined that the template is usable in at least one driver, wherein the template includes a plurality of parameters to designate functions to be executed by the printing apparatus.

8. A non-transitory computer-readable storage medium storing a program executable at least by a computer of an information processing apparatus capable of connecting to a printing apparatus and editing a template that designates functions to be executed by the printing apparatus upon printing, the program comprising:

specifying instructions configured to specify functions to be registered based on functions of the printing apparatus which can be selected by said information processing apparatus;

generation instructions configured to generate a template that designates execution of print processing using at least the functions specified according to said specifying instructions;

determining instructions configured to determine whether or not the template generated according to said generation instructions is usable in at least one driver of said information processing apparatus; and registration instructions configured to, when it is determined according to said determining instructions that the template is usable in at least one driver, register the template, wherein the template includes a plurality of parameters to designate functions to be executed by the printing apparatus.

* * * * *